United States Patent [19]
Park et al.

[11] Patent Number: 5,093,750
[45] Date of Patent: Mar. 3, 1992

[54] SYSTEM FOR RECORDING/REPRODUCING VIDEO DATA ON OR FROM A TAPE MEDIUM FOR STORING DIGITAL SIGNALS AND METHOD THEREIN

[75] Inventors: Chun-Woong Park; Eil-Suk Jung, both of Suwon, Rep. of Korea

[73] Assignee: SanSung Electronics Co., Ltd., Suwon, Rep. of Korea

[21] Appl. No.: 267,334

[22] Filed: Nov. 4, 1988

[30] Foreign Application Priority Data

Nov. 6, 1987 [KR] Rep. of Korea ............... 12524/1987
Dec. 4, 1987 [KR] Rep. of Korea ............... 13814/1987
Dec. 4, 1987 [KR] Rep. of Korea ............... 13816/1987

[51] Int. Cl.$^5$ ........................................... H04N 5/782
[52] U.S. Cl. ..................................... 360/19.1; 358/343
[58] Field of Search ................ 358/341, 343; 360/19.1

[56] References Cited

U.S. PATENT DOCUMENTS

| | | | |
|---|---|---|---|
| 4,463,387 | 7/1984 | Hashimoto et al. | 358/341 |
| 4,468,710 | 8/1984 | Hashimoto et al. | 358/343 |
| 4,602,295 | 7/1986 | Moriyama et al. | 358/343 |
| 4,604,655 | 8/1986 | Moriyama | 358/343 |
| 4,672,473 | 6/1987 | Sugiyama | 358/341 |

Primary Examiner—Donald McElheny, Jr.
Attorney, Agent, or Firm—Robert E. Bushnell, Esq.

[57] ABSTRACT

There is disclosed a technique whereby digital video signals can be recorded or reproduced on or from a magnetic tape. Using second controller to control a system such as a DAT recorder employing a digital signal processor, and first coutroller for converting said video signals into analog or digital, the video data are processed as in the conventional method of processing audio data according to the input of the mode selecting key. By the input of the key, the first controller converts analog video data into digital to store them in a memory, or reproduce said stored data by converting them into analog of real time, a different input of the key is checked by the second controller to store said video data into the tape. When storing said video data into the tape, the video signals are stored, imparted with synchronizing pulse to be distinguished from audio signals, and when reproducing said signals from the tape, the synchronizing pulse is detected to store only the video data into the memory, which data are reproduced by the first controller.

19 Claims, 13 Drawing Sheets

SYSTEM FOR RECORDING/REPRODUCING VIDEO DATA ON OR FROM A TAPE MEDIUM FOR STORING DIGITAL SIGNALS AND METHOD THEREIN

BACKGROUND OF THE INVENTION

The present invention relates to a system and a method therein for recording or reproducing digital video data on or from a tape medium for storing digital data.

Generally, a video or audio system uses an analog and digital signal when operating. Because analog signal processing technology has been long since employed, the problems, whenever arising therewith, have been solved, and therefore, problems are hardly encountered when constructing an application circuit. However, it is also well-known that the environment considerably affects the technology. On the other hand, a digital signal which is obtained by converting an analog signal into digital quanta (e.g. binary number) provides advantageous features which cannot be found in the analog signal processing technology. For example, the digital signal is hardly influenced by the surrounding noises, and the reproducing and coding thereof are easily accomplished. Further, it may use analogous signaling method (digitalized) for various signals of different forms. Also, thanks to the development of the digital signal processing integrated circuit have been much disclosed the technologies to help easily and cheaply construct circuit hardwares.

As the medium for recording the analog and digital signals are used magnetic tapes and disks. This medium, has been used mainly for recording or reproducing analog signals only. The tapes and disks are also used for storing digital data as in the subordinate memory devices of computers, and recently, for storing of digital audio data, too. For example, digital audio tape recorder (DAT) system employs the tapes as above. Other examples of the medium used for storing the digital audio data are compact disk and video disk. The disk for storing the digital data may carry both the digital audio and video signals, which enable the user to easily reproduce the desired audio or video signals with compact disk player (CDP) or video disk player (VDP). The tape for storing the digital data may be used to record only the digital audio signals, when DAT recorder records and reproduces the desired audio signals. Furthermore, the technique by which the analog video signals digitalized and stored in a memory are reproduced, read out of the memory has an application in HQVTR, video telephone, still camera, etc. However, there has not been the technique whereby the digitalized video signals are stored in a cheap digital record tape of high capacity, processed (reproducing and recording) by a digital signal processor of good error correction.

SUMMARY OF THE INVENTION

It is an object of the present invention to provide a system whereby video signals are digitalized and stored in a cheap tape medium to store considerable amount of data, and the stored data are easily reproduced, read out in the original analog video signal.

Another object of the present invention is to provide a system which may be used as a video file handling system to read out the stored digital data by using ordinary CDP, VDP, ODD in recording and reproducing means.

According to the present invention, said system for recording/reproducing video data on or from a tape comprises; video signal input means for receiving an image signal; video signal output means for displaying video signal; digital signal processor for editing, encoding and arranging tracks according to record when recording digital information on a record tape according to a given format and for processing said digital information with error correction when reproducing said digital information from said record tape; recording and reproducing means for mounting said record tape to record on reproduce the input on output digital video and audio data of said digital signal processor on or from said record tape; oscillating means for generating clock puleses of a predetermined frequency by a crystal oscillator and generating signals for controlling peripherals by frequency dividing of said puleses; circuit for detecting the vertical synchronizing pulse from the composite video signal outputted by said video signal input means; analog/digital converter for sampling and holding said composite video signal according to the sampling frequency of said oscillator and converting said signal into a digital data by quantimization; first switching means for designating a frame of said video signal input means when storing or outputting said frame into or from a given memory; second switching means for designating the video data stored in said memory for recording on said record tape; RAM for storing digital video data; first controller for generating to said RAM control signal for writing/reading by receiving the vertical synchronizing pulse detecting signal of said first switching means and said vertical synchronizing pulse detecting means, and generating the control signal to produce an address signal for access to said digital video information; second controller for controlling to record or reproduce digital information on or from said digital data record tape by controlling said recording and reproducing means of said digital signal processor according to the record and play key mode, and for generating the control signal to synchronize with the peripherals according to the data processing; means for generating the synchronizing pulse corresponding to the synchronizing enabling pulse of said second controller by said second switching means to separate audio signal from video signal; parallal/series converter for synchronizing by control of said second controller the parallel data read out from said RAM at the mode for recording data in said tape and converting said parallel data in series data; first multiplexer for selecting by control of said second controller the synchronizing pulse of said synchronizing pulse generating means and the video digital data output of said parallel/series converter; second multiplexer for selecting one of said video digital data outputted from said first multiplexer by the control signal of said second controller and the autio digital data inputted by audio signal input means; means for detecting the synchronizing pulse from the data recorded on said digital record tape outputted from said digital signal processor; demultiplexer for selecting by the output control signal of said second controller one of the video and audio signals outputted from said digital signal processor; series/parallel converter for converting the series video data of said demultiplexer into the parallel data by the control signal (clock and enable) outputted from said second controller; means for generating quasi-vertical synchronizing pulse by the control signal of said first controller; digital/analog converter for converting the digital data outputted from said RAM into the analog signal by the sampling signal of said oscillating means; adder for adding the vertical synchronizing pulse outputted from said quasi-synchronizing pulse generating circuit and the analog video signal of said digital/analog converter to produce a composite video signal for displaying at said video signal output means; first converter for collecting said digital video data so as to correspond to the access time according to the frequency dividing signal of said oscillating means and converting said data into parallel; input and output port circuit for selecting the direction according to reading-/writing of the video data from said RAM by the signal for controlling the direction of data flow of said first controller, and controlling the data converted digital to analog to be outputted, converted digital to analog; second converter for collecting as desired video data read out from said RAM through said input and output port circuit, and converting said data into series; first controller for counting the signals generated by said oscillating means according to store said analog to digital converted data into said RAM, and generating the address signal of said RAM to output said stored data after converting it into analog; second counter for counting the clock pulses outputted from said second controller to generate the address signal when recording or reproducing the data from said RAM on or from said tape; third multiplexer for selecting the address signal corresponding to the outputs of said first and second counters by the output control signal of said second controller; selector means for selecting writing-/output enabling signals WE, OE outputted from said first and second controller in fourth and fifth multiplexers according to the control signal produced from said second controller; gate circuit; first buffer for buffering the input data of said parallel/series controlled by the output of the AND gate of said gate circuit; and second buffer for buffering the output data of said series/parallel converter by the output of the AND gate of said gate circuit, said gate circuit establishing the enabling and data passage of said buffers according to the first and second output control signals of said second controller, said recording and reproducing means with a digital record tape recording the data processed in said digital signal processor according to the control of said second controller, and reproducing the digital data to be processed from said tape. The present invention will now be described specifically with reference to the attached drawings.

DETAILED DESCRIPTION OF THE INVENTION

Figure 1:
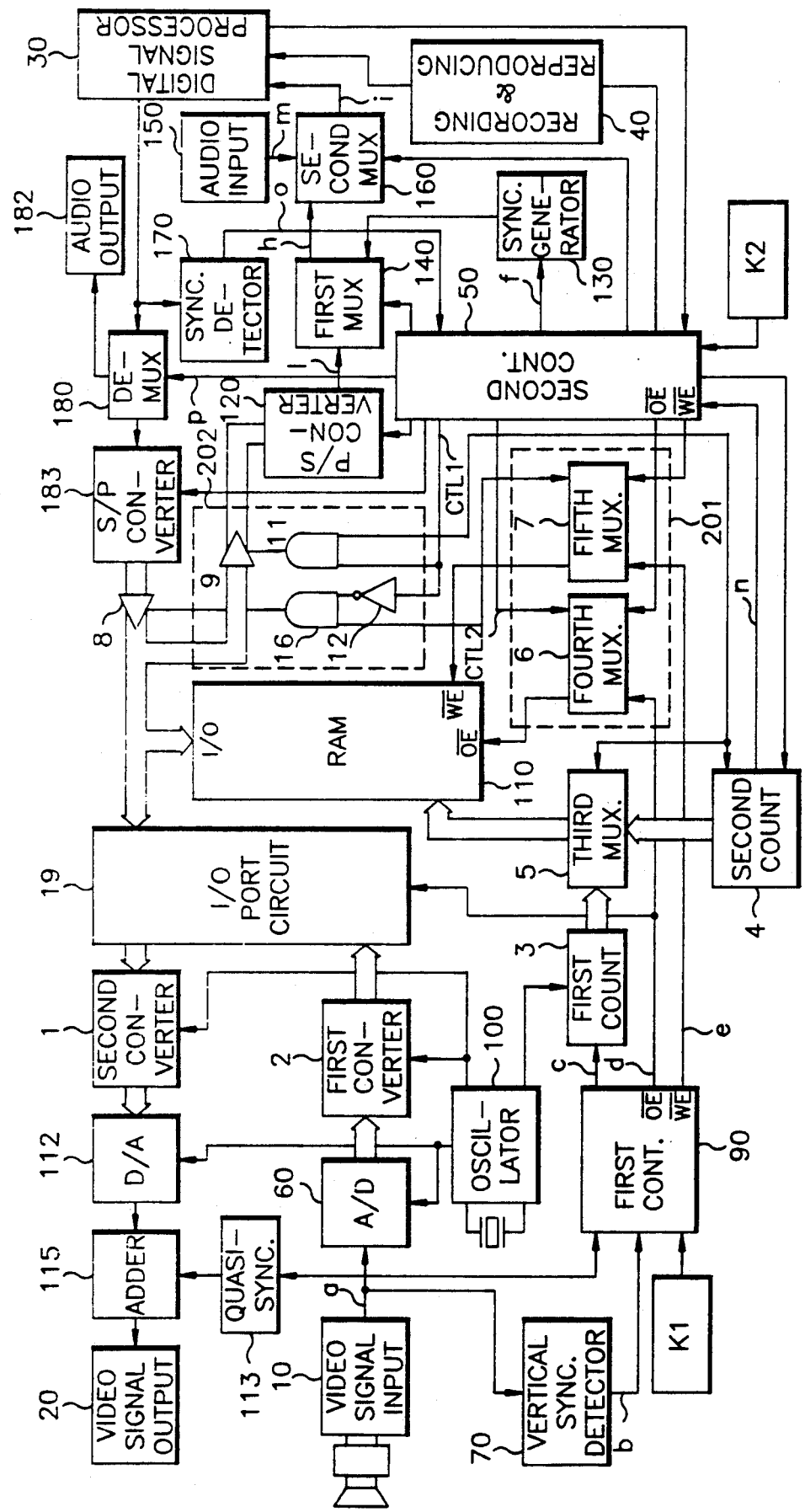
FIG. 1 is a block diagRAM of the circuit according to the present invention.

Referring to FIG. 1, the circuit of the present invention comprises video signal and input means 10 for receiving an image signal video signal output means 20 for displaying video signal, digital signal processor 30 for editing, encoding and arranging tracks according to record when recording digital information on a record tape according to a given format and for processing said digital information with error correction when reproducing said digital information from said record tape, recording and reproducing means 40 for mounting said record tape to record or reproduce the input or output digital video and audio data of said digital signal processor 30 on or from said record tape, oscillating means 100 for generating clock pulses of a predetermined frequency by a crystal oscillator (X-TAL) and generating signals for controlling peripherals by frequency dividing of said pulses, circuit 70 for detecting the vertical synchronizing pulse from the composite video signal outputted by said video signal input means 10, analog/-digital converter 60 for sampling and holding said composite video signal according to the sampling frequency of said oscillator 100 and converting said signal into digital data by quantimization, first switching means K1 for designating a frame of said video signal input means 10 when storing or outputting said frame into or from a given memory. Second switching means K2 for designating the video data stored in said memory for recording on said record tape, RAM 110 for storing digital video data, first controller 90 for generating to said RAM 110 control signal for writing/reading by receiving the vertical synchronizing pulse detecting signal of said first switching means K1 and said vertical synchronizing pulse detecting means 70, and generating the control signal to produce an address signal for access to said digital video information, second controller 50 for controlling to record or reproduce digital information on or from said digital data record tape by controlling said recording and reproducing means 40 of said digital signal processor 30 according to the record and play key mode, and for generating the control signal to synchronize with the peripherals according to the data processing, means 130 for generating the synchronizing pulse corresponding to the synchronizing enabling pulse of said second controller 50 by said second switching means K2 to separate audio signal from video signal, parallel/series converter 120 for synchronizing by control of said second controller 50 the parallel data read out from said RAM 110 at the mode for recording data in said tape, and converting said parallel data in series data, first multiplexer 140 for selecting by control of said second controller 50 the synchronizing pulse of said synchronizing pulse generating means 130 and the video digital data output of said parallel/series converter 120, second multiplexer 160 for selecting one of said video digital data outputted from said first multiplexer 140 by the control signal of said second controller 50 and the audio digital data inputted by audio signal input means 150, means 170 for detecting the synchronizing pulse from the data recorded on said digital record tape outputted from said digital signal processor 30, demultiplexer 180 for selecting by the output control signal of said second controller 50 one of the video and audio signals outputted from said digital signal processor 30, series/parallel converter 183 for converting the series video data of said demultiplexer 180 into the parallel data by the control signal (clock and enable) outputted from said second controller 50, means 113 for generating quasi-vertical synchronizing pulse by the control signal of said first controller 90, digital/analog converter 112 for converting the digital data outputted from said RAM 110 into the analog signal by the sampling signal of said oscillating means 100, adder 115 for adding the vertical synchronizing pulse outputted from said quasi-synchronizing pulse generating circuit 113 and the analog video signal of said digital/analog converter 112 to produce a composite video signal for displaying at said video signal output means 20, first converter 2 for collecting said digital video data so as to correspond to the access time according to the frequency dividing signal of said oscillating means 100 and converting said data into parallel, input and output port circuit 19 for selecting the direction according to reading/writing of the video data from said RAM 110 by the signal for controlling the direction of data flow of said first controller 90, and controlling A/D data to be outputted through D/A, second converter 1 for collecting as desired video data read out from said RAM 110 through said input and output port circuit 19, and converting said data into series, first counter 3 for counting the signals generated by said oscillating means 110 according to the control signal of said first controller 90 to store said A/D converted data into said RAM 110, and generating the address signal of said RAM 110 to output said stored data after converting it D/A, second counter 4 for counting the clock pulses outputted from said second controller 50 to generate the address signal when recording or reproducing the data from said RAM 110 on or from said tape, third multiplexer 5 for selecting the address signal corresponding to the outputs of said first and second counters 3 and 4 by the output control signal CTL2 of said second controller 50, selector means 201 for selecting writing/output enabling signals $\overline{WE}$, $\overline{OE}$ outputted from said first and second controller 90 and 50 in fourth multiplexer 6 and fifth multiplexer 7 according to the control signal CTL2 produced from said second controller 50, gate circuit 202, first buffer 9 for buffering the input data of said parallel/series converter 120 by the output of the AND gate 11 of said gate circuit 202, and second buffer 8 for buffering the output data of said series/parallel converter 183 by the output of the AND gate 16 of said gate circuit 202, said gate circuit 202 establishing the enabling and data passage of said buffers 8 and 9 according to the first and second output control signals CTL1 and CTL2 of said second controller 50, said recording and reproducing means 40 with a digital record tape recording the data processed in said digital signal processor 30 according to the control of said second controller 50, and reproducing the digital data to be processed from said tape.

A video camera is connected with the video signal input means 10, still printer, monitor, liquid crystal display, camera, TV, and the video signal output means 20 are connected with TV. The recording and reproducing means 40 mounts CD, ODD or DAT for medium, to record and reproduce digital data. The first and second switching means K1 and K2 are constructed to select writing and reading out a frame of video data into or of the RAM 110. Additionally, the first switching means K1 is controlled to directly display. When recording continuous video signals, the first and second switching means K1 and K2 are constructed to be simultaneously operated. Moreover, the second switching means K2 may be given all the functions required for recording/reproducing of the recording and reproducing means 40. The first and second controller 50 and 90 check each other so as not to produce errors during data transmission, and the circuit thereof may be a microprocessor or one-chip MICOM, or may be substituted by a separate controller for processing digital data.

Describing a specific embodiment of the present invention with reference to FIG. 1, a predetermined key is inputted by the second switching means K2 when storing digital data into the record tape of the recording and reproducing means 40. Then, second controller 50 generates a control signal in order to designate RAM 110 to the recording mode, while digital signal processor 30 and recording and reproducing means 40 get ready so as to record data on the medium. In this state, when the user operates first switching means K1, first controller 90 checks it, and the state of the vertical synchronizing pulse inputted from vertical synchronizing pulse detecting circuit 70. The circuit 70 separates only the vertical synchronizing pulse from the video signal outputted from video signal input means 10. Analog/digital converter 50 samples the video signal according to the signal 3fsc or Nfsc outputted from the oscillator 100, and converts it into digital data by quantimization of it into K bit, transferring it into first converter 2. First controller 90 resets first counter 3 and designates RAM 110 to writing mode at the time of inputting the synchronizing pulse generated from the vertical synchronizing pulse detecting circuit 70, which the writing enabling signal $\overline{WE}$ of first controller 90 selects, controlling third multiplexer 5 and fifth multiplexer 7 controlled by second controller 50. Here, RAM 110 is designated to the writing mode, supplied with an address signal. Namely, first controller 90 controls first counter to select the output signal of the oscillator 100 and count the addressing of RAM 110. Here, the signal counted by first counter 3 becomes the address signal of RAM 110, writing of data into the designated address of RAM 110 determines the direction of video data flow according to the state of the output enabling terminal $\overline{OE}$ of first controller 90. Establishing the direction at input and output port circuit 19 by the output enabling terminal $\overline{OE}$, first converter 2 converts the data according to the access time of RAM 110, when the first converter 2 collects as required the digital video data outputted from analog/digital converter 60, converting them into parallel to store them into RAM 110 through input and output port circuit 19 the output direction of which is selected or output them directly through second converter 1. First controller 90 counts the number for a frame of data from the starting point of the vertical synchronizing pulse of the circuit 70, and checks the finishing of the vertical synchronizing pulse input before the next vertical synchronizing pulse enters, thereby finishing the counting and storing the data into the address designated according to the addressing. Here, a frame of the output of the analog/digital converter 60 is stored into the RAM 110. Once the composite video signal is stored into RAM 110 through analog/digital converter 60, the output of the output enabling terminal $\overline{OE}$ of the first controller 90 becomes "low", causing the data to be read out of the RAM 110, because first controller 90 takes the counting action for addressing after resetting first counter 3. The corresponding data is read out by the addressing signal, and the direction of data flow is adjusted by controlling the input and output port circuit 19 by first controller 90. When the data read out of the RAM 110 is outputted through the input and output port circuit 19, second converter 1 collects the required data according to the access time of the RAM 110, converting them into series to input them into digital/analog converter 112. The digital/analog converter 112 converts the digital data into the analog signal according to the sampling frequency generated by the oscillating means 100. On the other hand, first controller 90 controls quasi-synchronizing generating circuit 113 to produce the vertical synchronizing pulse, which quasi-synchronizing circuit 113 may be omitted depending on the process. Hence, the video analog signal and vertical synchronizing pulse are added in adder 115 to reproduce the original composite video signal. When storing the next frame inputted, the above operating steps are repeated as required, and the designation of the frame is made by the number inputted by sequentially operating first switching means K1.

However, the user need not to maintain all the frames stored as above on the tape namely, if the next frame inputted is better than before, the preceding frames may be eliminated to maintain only the desired frames, when recording and reproducing means 40 records the frames to be maintained in the recording mode through operating second switching means K2 to check the frames. Receiving clock pulses from digital signal processor 30, second controller 50 controls synchronizing pulse generating circuit 130 to generate the synchronizing pulse for distinguishing audio and video signals on the tape. The generating of synchronizing pulses will be explained specifically with reference to FIGS. 2-9.

When the synchronizing pulse is inputted to the digital signal processor 30 through first and second multiplexer 140 and 160 and the record of the required synchronizing data is finished, second controller 50 makes the first and second control signals CTL1 and CTL2 "high" to enable first buffer 9, and controls parallel/series converter 120 to output the video data in parallel. Namely, the video data reads out of the RAM 110 controls the third, fourth and fifth multiplexer 5, 6 and 7 by second control signal CTL2 of second controller 50 to select one of the signals of writing enabling terminal $\overline{WE}$ and the signal of outputting enabling terminal $\overline{OE}$ in second controller 50, and the addressing count signal generated from second counter, thereby designating the video data to read out of RAM 110. If the designation signal is outputted, the data is buffered in first buffer 9 enabled, and converted into series in parallel/series converter 120 by control of second controller 50, being outputted.

Hence, second controller 50 controls first multiplexer 140 to select a pure video signal converted into series after finishing of the synchronizing pulse input, outputting it, and second multiplexer 160 to input the video data outputted from the first multiplexer 140 to digital signal processor 30. Receiving the video signal, the digital signal processor 30 edits and encodes it according to the specified record format desired of the digital data tape, and processes it according to the track specification to record it on the record tape through recording and reproducing means 40 by the control of second controller 50. After addressing of the RAM 110, second counter 4 sends to second controller 50 the signal representing the completion of the addressing. If second controller 50 recognizes this, the controlling role of RAM 110 is transferred to first controller 90. When reproducing the video data recorded on the tape, the reproducing mode is designated through second switching means K2, where second controller 50 designates recording and reproducing means 40 by receiving the key input to drive the tape. If the tape is driver, second controller 50 controls recording and reproducing means 40, and digital signal processor 30 receives digital data from recording and reproducing means 40 to input them to demultiplexer 180 and synchronizing pulse detecting means 170 after correcting errors and other processing. The synchronizing pulse detecting means 170 detects the synchronizing pulse of the video data given during recording.

The detection of the synchronizing pulse detecting means 170 will be explained in the later part of the specification with reference to FIG. 1-4.

Second controller 50 receiving the detecting signal controls the RAM 110. In this case, first control signal, terminal CTL1 of the second controller 50 becomes "low", and the second control signal terminal CTL2 becomes "high". Cousequently, the second buffer 8 is enabled, the demultiplexer 180 is selectively controlled by the control signal outputted from second controller 50, and the video signal processed in digital signal processor 30 are converted into parallel by series/parallel converter 183 through demultiplexer 180, thereby being outputted the enabled second buffer 8. Namely, the outputting and writing control signal of second controller 50 is selected by fifth multiplexer 7, and the signal counted for addressing by second counter 4 is inputted as the address signal of the data to be recorded on the RAM 110 through the selected passage of third demultiplexer 5. After addressing of the RAM 110, if all the video data are stored into the RAM 110, second counter 4 sends the signal representing the completion of the addressing to the second controller 50. If the control of the second controller 50 is completed, the control of RAM 110 is made by the first controller 90. In this case, fourth multiplexer 6 selects the output enabling signal of first controller 90 to designate RAM 110 to the reading mode, and controls third multiplexer 5 to receive the addressing signal of first counter 3 and designate the reading address of the video data stored in RAM 110. The video data reads out of the RAM 110 by designating the address are inputted to second converter 1 through input and output port circuit 19 the direction of the data flow of which is determined by control of first controller 90. The second converter 1 converts the data into parallel according to the access time for outputting. At this time, first and second buffers 8 and 9 become high impedance, so that the data can not flow reversely, and the data read out are inputted to digital/analog converter 112 through the second converter 1. The digital/analog converter 112 converts the digital video data into analog signal through the sampling signal supplied from oscillating means 100 for outputting. First controller 90 controls guasi-synchronizing pulse generator 113 to generate the vertical synchronizing pulse inputted to adder 115. Adder 115 combines the vertical synchronizing signal and the converted analog signal to reproduce it at video signal output means 20.

On the other hand, expanding the capacity of RAM 110 and operating simultaneously the first and second switching means K1 and K2, the video signal inputted may be continuously recorded and reproduced. additionally, connecting all the system with the digital record medium such as CDP, VDP, ODD, etc of recording and reproducing means 40, the video file becomes versatile and may be easily managed.

Figure 2:
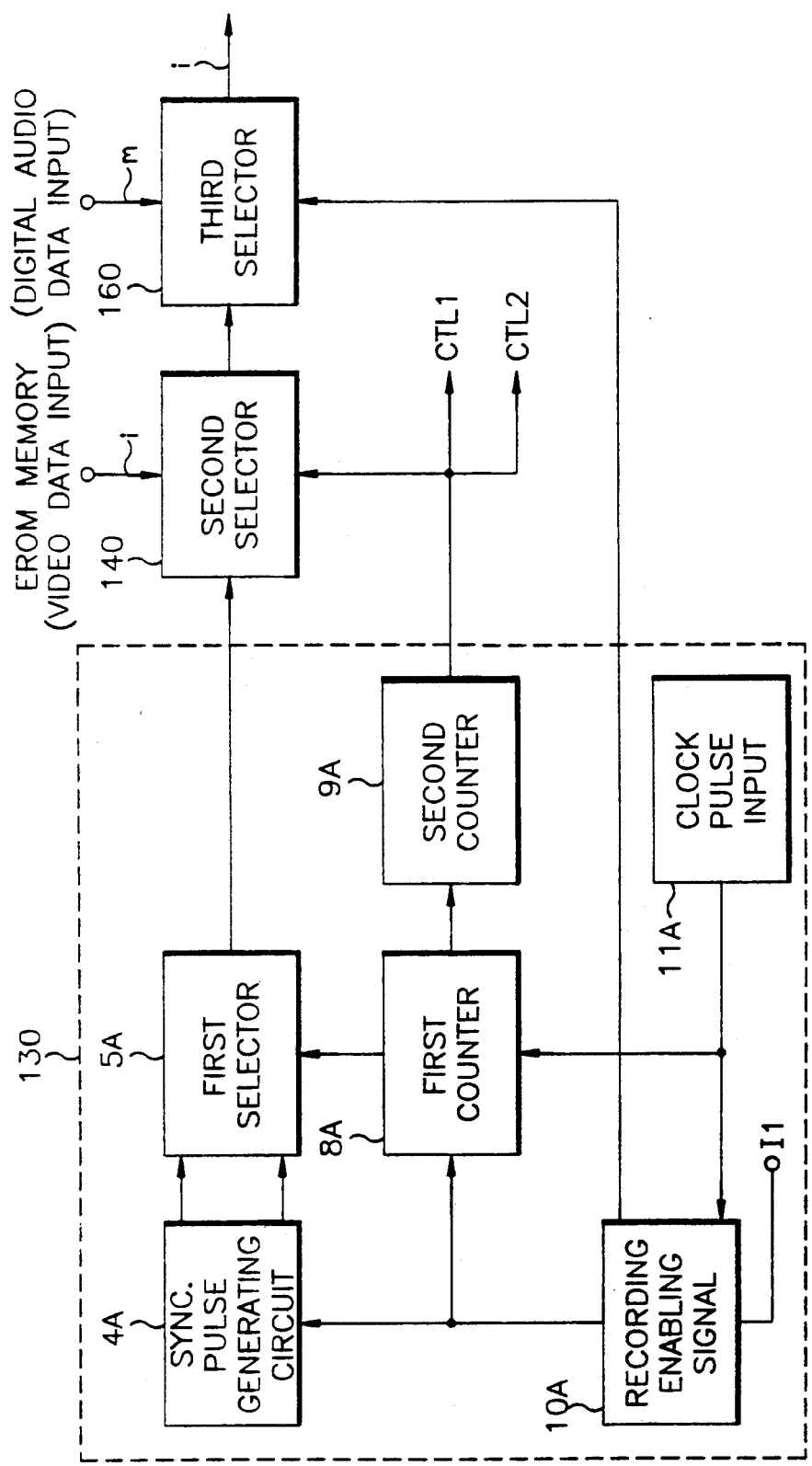
FIG. 2 is a block diagRAM for showing the synchronizing pulse generating part (130) of FIG. 1.

Referring FIGS. 2 to 9, the synchronizing pulse generating means 130 will be described specifically as follows:

FIG. 2 is a block diagram representing the synchronizing pulse generating means 130 of FIG. 1.

The synchronizing pulse generating means 130 comprises clock pulse input part 11A, video data recording enabling signal generating circuit 10A for generating the signal outputted from said clock pulse input means 11A, the initial reset signal, and the signal for enabling the synchronizing pulse to be generated for recording according to the signal representing the addressing of the RAM 110 of memory for storing digitalized video data by receiving the switching signal to record on a digital audio tape the video tape of the RAM 110, synchronizing pulse generating circuit 4A for generating 7FFF and 8000 data of synchronizing by the output enabling signal of said video data recording enabling signal generating circuit 10A, first counter 8A for alternating by selecting and controlling the outputs 7FFF and 8000 of said synchronizing pulse generating circuit 4A by counting the signal of said clock pulse input means 11A from the enabling signal outputted from said video data recording enabling signal generating circuit 10A, first selector means 5A for selecting one of the synchronizing data outputs of said synchronizing pulse generating circuit 4A by using as a control signal, the signal outputted from said first counter 8A, second counter 9A for controlling the output signal of said first counter 8A to have a predetermined number of synchronizing data from the enabling signal outputted from said video data recording enabling signal generating circuit 10A, and generating the control signal for said RAM 110 to recognize the addressing and data recording on the digital tape, second selector means 140 for selecting to output the data outputted through series converter 120 from the RAM 110 storing digital video data and the output synchronizing data of said first selector means 5A according to the output of said second counter 9A, and third selector means 160 for selecting the audio signal outputted from audio signal input means 150 and the output of said second selector means 140 by the output of said video data recording enabling signal generating circuit 10A.

Explaining briefly, an embodiment of the present invention according to the above construction, if through clock pulse input means 11A is inputted the timing pulse related with recording from the digital to analog tape recorder (DAT) system, and video data recording enabling signal generating circuit 10A operates second selector means 4 for selecting to record the video data on the digital audio tape, the video data recording enabling signal generating circuit 10A generates the enabling signal for recording the video data on the tape.

The enabling signal is inputted to the synchronizing pulse generating circuit 4A, first and second counters 8A and 9A, and third selector means 160.

The synchronizing pulse generating circuit 4A generates the data of 7FFF and 8000 corresponding respectively to the maximum pitch and the minimum pitch of the data distribution used in a digital audio tape recorder.

Thin indicates the signal for distinguishing the video data before recording from audio data, then the system is cleared.

Second selector means 140 is made ready to selectively input the synchronizing data as a step prior to recording the video data on the tape, while third selector means 160 is made ready to selectively input the output of said second selector means 140.

The first counter 8A cleared as above counts the predetermined clock pulses in binary mode.

The counted output is inputted to first selector means 5A to alternatingly produce the data of 7FFF and 8000 twice each as the output of the synchronizing pulse generating circuit 4.

The output of first counter 1A is counted in penta-counter mode, which penta-counter mode counting output controls second selector means 140 to cause the synchronizing data 7FFF and 8000 outputted from first selector means 5 to be repeatedly inputted sixteen times (eight of 7FFF, eight of 8000), so that the synchronizing data are made in a desired format.

The signal outputted through the control terminals CTL1 and CTL2 generates memory addressing enabling signal to RAM 110.

When the video data stored in RAM 110 are recorded on the tape, the control signal representing this is produced.

When the sixteen synchronizing data are alternatingly recorded on a digital audio tape through third selector means 160 selected, the data pattern recorded does not exist in the audio, and therefore is distinguished to recognize the recording of the video data.

Hence, if the predetermined number of the synchronizing data are all inputted by counting of the second counter 9A, second selector means 140 selects the video digital data read out of RAM 110 by the address signal according to the memory addressing enabling, recording them on the tape through selector means 160 selected by the video data recording enabling signal generating circuit 10A.

On the other hand, the synchronizing data recorded on the tape when reproducing the video data from the tape do not exist in the audio pattern, so that the synchronizing pulse of the video data is only detected during detection, and the video data are only reproduced for processing.

The detection of video data is described in the later portion of this specification with reference to FIGS. 10 to 14.

Figure 3:
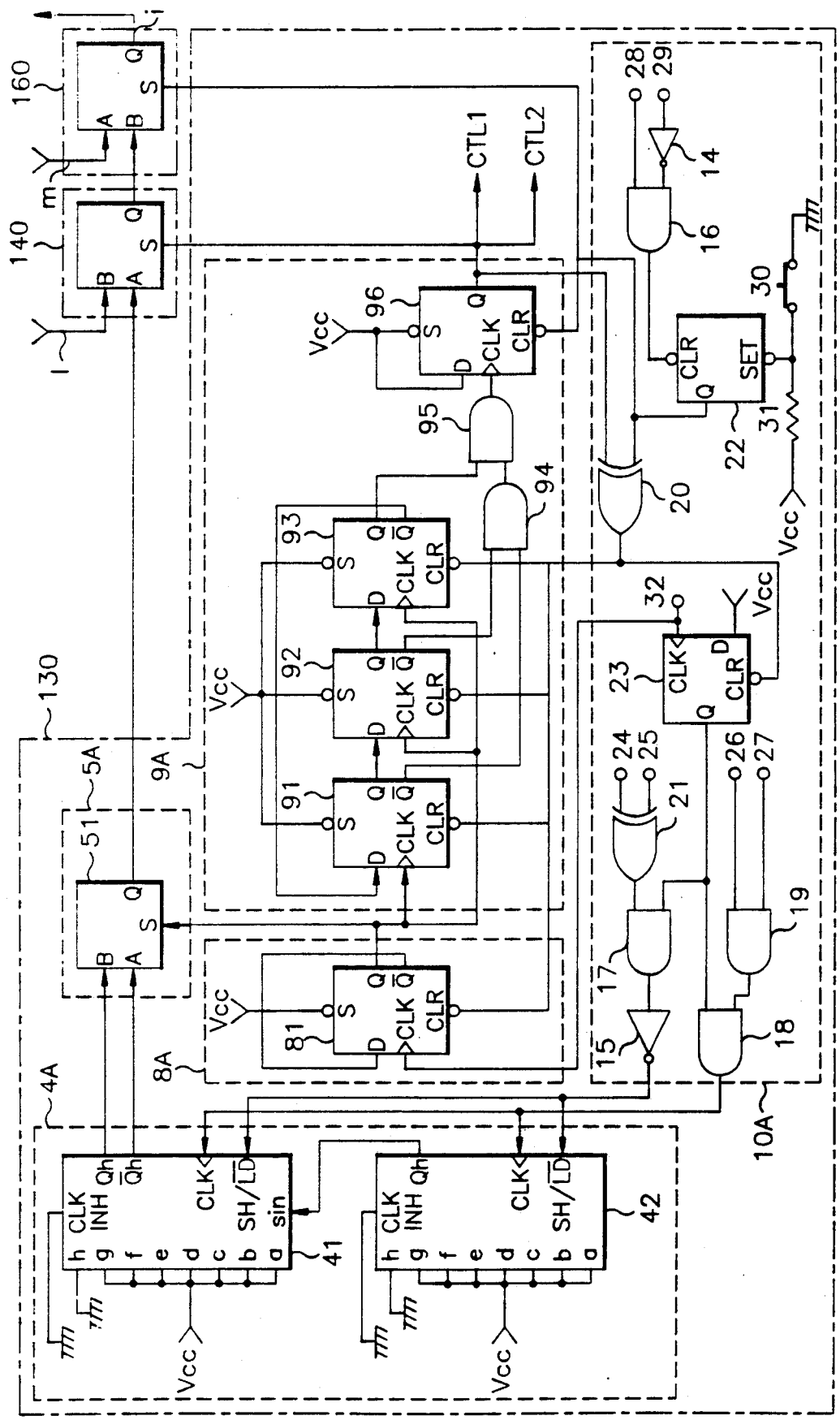
FIG. 3 is a specific circuit diagram of FIG. 2.

Referring FIG. 3 for showing specifically the circuit of FIG. 2, the video data recording enabling signal generating circuit 10A is constructed so that 3 MHZ is inputted to first clock pulse input terminal 27 from the DAT recorder system, 48 KHZ to second clock pulse input terminal 32, 48 KHZ of the same clock pulse frequency as the input clock pulse frequency as the input clock pulse of second clock pulse input terminal 32 to third clock pulse input terminal 24 with 15 clock pulses delaying (in the time of 15/3 MHZ), 48 KHZ to fourth clock terminal 25 with delaying of 16 clock pulses (the time of 16/3 MHZ) than the input of second clock terminal 32, and 96 KHZ which is twice the input clock pulses 48 KHZ of second clock terminal 32 to fifth clock terminal 26.

The first and fifth, clock terminals 27 and 26 are connected with the input terminal of AND gate 19. The output terminal of the exclusive OR gate 21 is connected with the input terminal of AND gate 17. The output terminal of the AND gate 19 is connected with the input terminal of AND gate, while the initial reset signal is connected to the input terminal of AND gate 16 through the reset terminal 28. When the addressing is completed, the signal representing the completion of the addressing is inputted to the input terminal of the AND gate 16 through inverter 14, passing addressing completion signal terminal 29. The output terminal of the AND gate 16 is connected with the clear terminal CLR of D flip-flop 22, while the set terminal of the D flip-flop is connected with resistor 31 from power supply VCC. The power supply VCC is to record on DAT the video data stored in RAM 110, and connects with switch SW1 to synchronize the clock pulses 48 KHZ, 96 KHZ, and 3 MHZ outputted from DAT. The output terminal Q of the D flip-flop is connected with the input terminal of exclusive OR gate 20, while the output terminal of the exclusive OR gate 20 is connected with the clear terminal CLR of D flip-flop. The clock terminal CLK of the D flip-flop 23 is connected with the second clock terminal 32, while the output terminal Q of the D flip-flop 23 is connected with the input terminals of the AND gates 18 and 17. The output terminal of the AND gate 17 is inputted to inverter 15. The synchronizing pulse generating circuit 4A is constructed so that the output terminal of the AND gate 18 is connected with the clock terminal CLK of first and second parallel/series shift registers 41 and 42, and the output terminal of the inverter 15 is connected with the shift-/load terminal SH/$\overline{\text{LD}}$ of the first and second parallel/series shift registers 41 and 42. The input terminal a-h of the first and second parallel/series shift registers 41 and 42 is connected with the power supply VCC.

The output terminal Qh of the first parallel/series shift register 42 is connected with the series input terminal sin of the second parallel/series shift register 41, while synchronizing pulse is generated to the output terminals Qh, $\overline{\text{Qh}}$ of the first parallel/series shift register 41. The first selector means 5A is constructed so that the output terminals Qh, $\overline{\text{Qh}}$ are connected with the input terminals A and B of multiplexer 51. Second counter 8 is constructed so that the signal of the second clock terminal 32 is connected to the clock terminal CLK of D flip-flop 81, and the output terminal of the exclusive OR gate 20 is connected with the clear terminal CLR of the D flip-flop 81. The data terminal D of D Flip-Flop is connected to the output terminal Q of the D flip-flop 81 so that the signal outputted from the output terminal Q is the case that the clock pulses are counted in binary mode. The output of the binary counting is applied to selecting control terminal S of the multiplexer 51, being used as a clock pulse of the next stage. Second counter 9 is constructed so that the output terminal Q of D flip-flop 81 of the first counter 8, the clock terminals CLK of D flip-flops 91-93 are connected, and to the clear terminals CLR of the D flip-flops 91-93, the output terminal of the exclusive OR gate 20 is connected.

Each output terminal Q of the D flip-flops 91-92 is connected with the data terminal D in series, and also with the input terminal of AND gate 94.

To the input terminal of AND gate 95, the output terminal Q of D Flip-flop 93 and the output terminal of AND gate 94 are connected, while the output terminal of the AND gate 95 is connected with the clock terminal CLK of D flip-flop 96.

The output terminal Q of the D flip-flop 96 is connected with the address enabling control terminals CTL 1 and CTL 2 which connect the input terminal of the exclusive OR gate 20 and the RAM 110, second selector means 140 is constructed so that the output terminal Q of the D flip-flop 96 is connected with the selecting control terminal S of multiplexer 140, the output terminal Q of the multiplexer 51 is connected with the terminal A of the multiplexer 140, and the video data terminal 1 from RAM 110 is connected with the terminal B. Third selector means 160 is constructed so that the output terminal Q of the D flip-flop 22 is connected with the selecting control terminal S of multiplexer 160, the output terminal Q of the multiplexer 140 is connected with the terminal B, and the digital audio data terminal m is connected with the terminal A, so as to the output terminal Q to the signal processing means of DAT.

Figure 4:
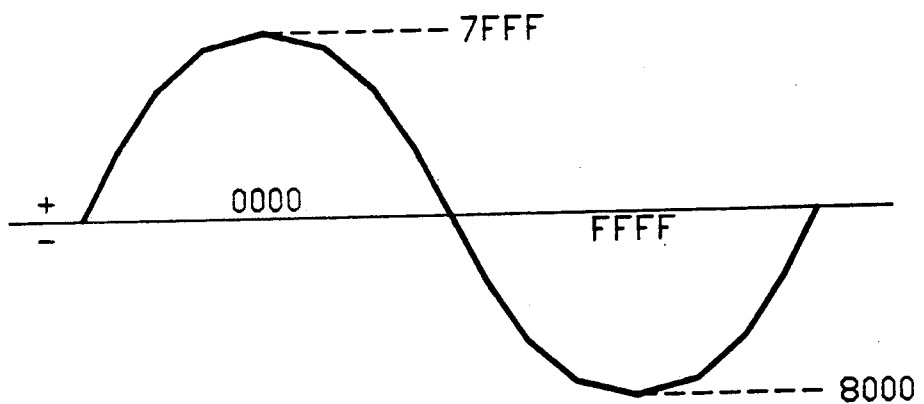
FIG. 4 is a waveform for showing generally the distribution of audio data of a digital audio tape.
Figure 5:
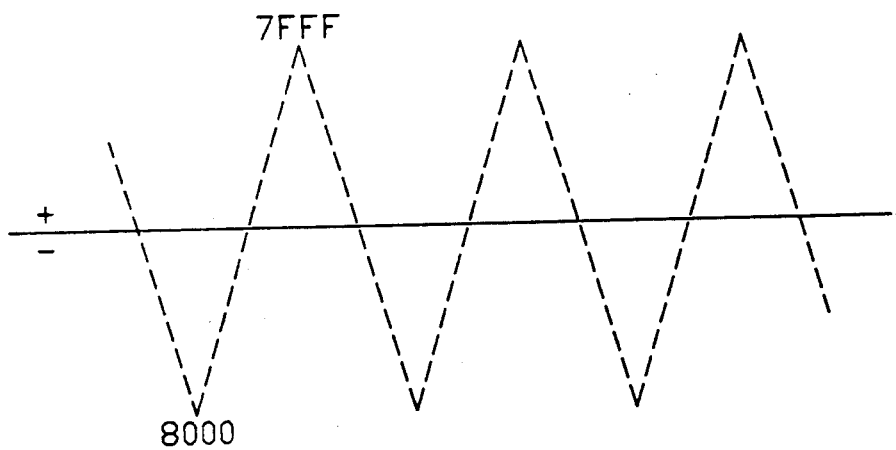
FIG. 5 is an extracted waveform of the synchronizing data of the digital video part.
Figure 6:
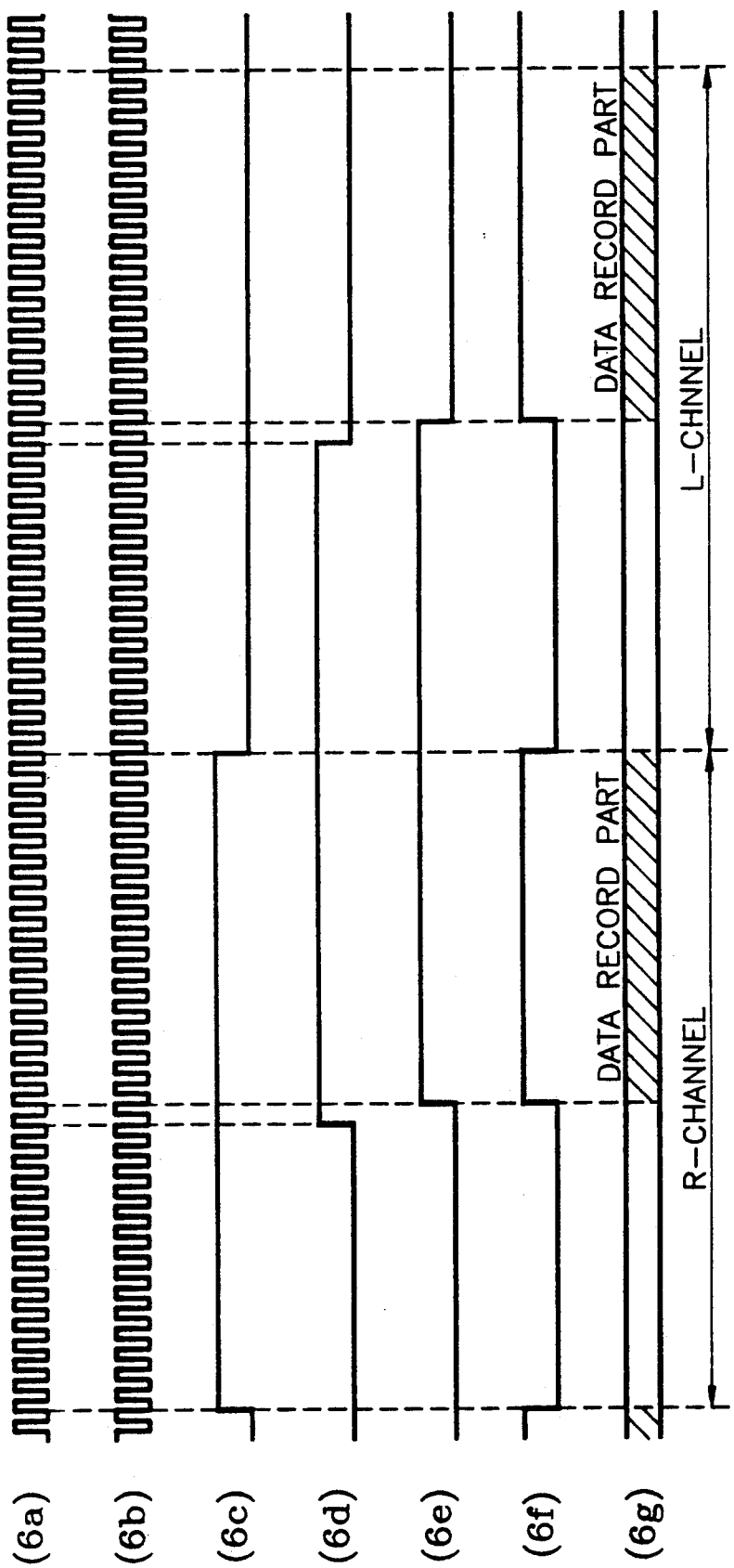
FIG. 6 is a waveform for showing the clock pulses produced from a conventional digital audio tape system.

FIG. 4 is a waveform for showing generally the distribution of audio data of digital audio tape FIG. 5 is an example of the synchronizing data waveform according to the present invention, and FIG. 6 the data recording waveform in a digital audio tape system, which shows the input waveform of the first to fifth clock terminals 24,25,26,27,32 of FIG. 3. 6a is an example for showing the input 3 MHZ signal of first clock signal 27, 6b the reversed waveform of 6a, 6c is an example for showing 48 KHZ signal of second clock terminal 32, 6d is an example for showing the 48 KHZ pulse of 6c being delayed by 15 clock pulses, which is an example of the input signal of third clock terminal 24, 6e is an example for showing the 48 KHZ signal of 6c being delayed by 16 clock pulses, which is an example of the input signal of fourth clock terminal 25, 6f the clock pulses twice the 6c, which is an example of the input signal of fifth clock terminal 26, and 6g an example of recording the synchronizing data according to the left and right channels L and R.

Figure 7:
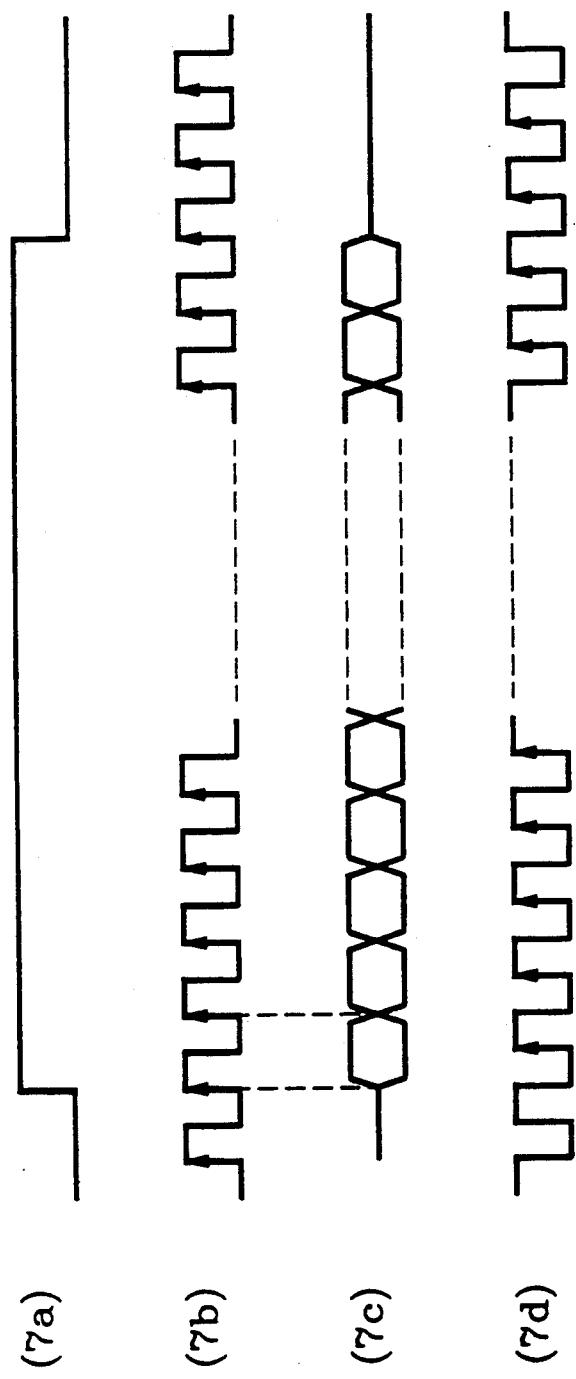
FIG. 7 is a waveform of data recording in a conventional digital audio system.

FIG. 7 is a waveform of the data recording operation in a conventional digital audio tape system, wherein 7a is the input waveform of fifth clock terminal 26, 7b is the input waveform of first clock terminal 27, 7c is an example of the input data, and 7d is the catch clock in DAT.

Figure 8:
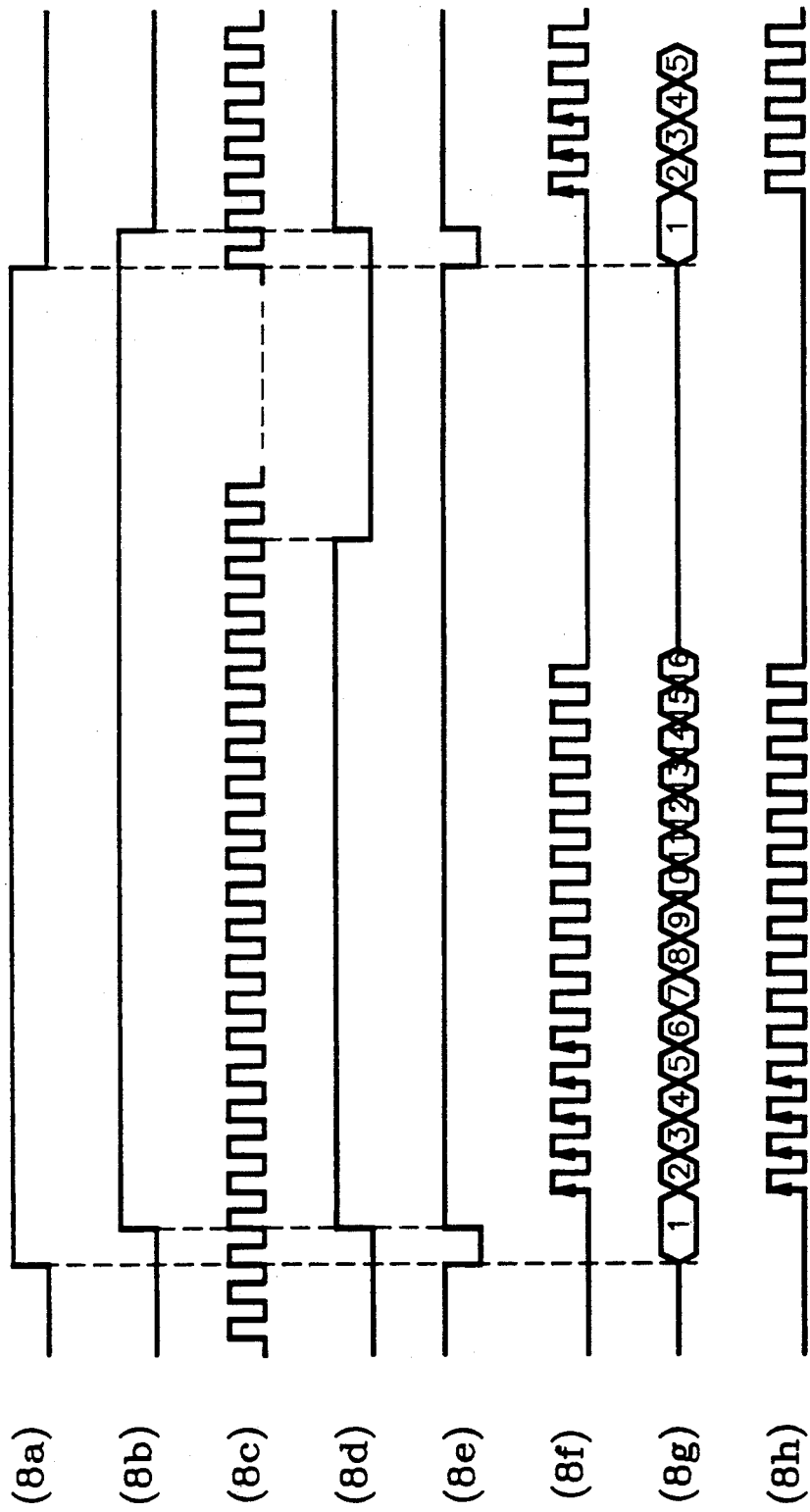
FIGS. 8 and 9 show further waveforms of operation in FIG. 3 in accordance with the present invention.
Figure 9:
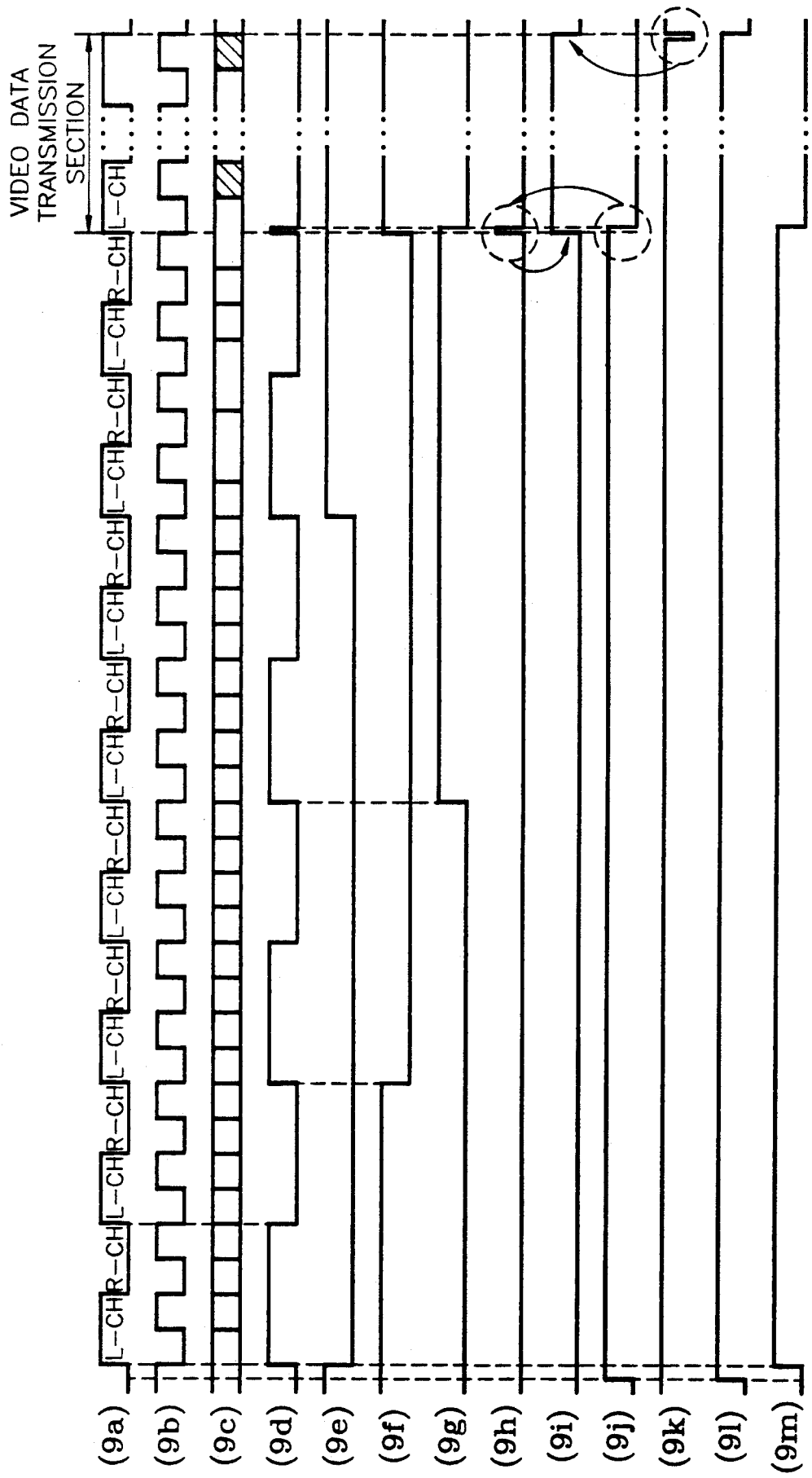

FIGS. 8 and 9 are waveforms of the synchronizing pulse generating operation according to the present invention, wherein 8a and 8b are the input waveforms of the third and fourth clock terminals 24 and 25. 8c is the input waveform of first clock terminal 27, 8d is the input waveform of fifth clock terminal 26, 8e is the output signal of inverter 15, 8f is the input signal of the clock terminal CLK of first and second parallel/series shift registers 41 and 42, 8g is the output waveform of the output terminal Qh of first parallel/series shift register 41, and 8h is the reversed signal of the 8c, which is the catch clock in DAT. On the other hand, 9a is the input signal waveform of the second clock terminal 32, 9b is the input signal waveform of fifth clock terminal 26, 9c is an example of the output data of multiplexer 51, 9d is the output signal of the output terminal Q of D flip-flop 81, 9e-9g are the output signals of the output terminal Q of D flip-flops 91-93, 9h is an example of the output signal of AND gate 95, 9i is the output signal of the output terminal Q of D flip-flop 96, 9j is an example of the output of the exclusive OR gate 20, 9k is an example of the input of the clear terminal CLR of D flip-flop 22, 91 is an example of the output terminal Q of D flip-flop 22, and 9m is an example of the output terminal Q of D flip-flop 23.

Referring to FIGS. 2-9, an embodiment of synchronizing pulse generating will now be described specifically.

The 6a and 6f signals of FIG. 6 generated from DAT system are inputted to AND gate 19, while the 6c signal is inputted to the clock terminals CLK of D flip-flops 23 and 81. The 6c signal, after delayed by 15,16 clock pulses, is inputted to the exclusive OR gate 21. If the state of the output terminal Q of D flip-flop 23 is latched "high", the 6a signal in the "high" interval of the 6f signal of fifth clock terminal 26 is inputted to the clock terminals CLK of first and second parallel/series shift registers 41 and 42 through the AND gates 18 and 19, so that the shift/load of first and second parallel/series shift registers 41 and 42 are established through the inverter 15 and AND gate 17 by the output obtained by subjecting the 6d and 6e signals to logic in the exclusive OR gate 21. Before storing the video data in the digital audio tape, the synchronizing pulse is generated to record as in 6g according to each channel. The generated signal is recorded on the digital audio tape as in FIG. 7. If the synchronizing data in the "high" interval of the 7a signal are generated as in 7c according to the 7b clock pulse, according to the catch clock of DAT system of 7d are processed the data in the signal processing means so as to record the synchronizing pulse. When the video data have been stored into RAM 110, and DAT recorder has entered the recording mode, pushing switch 30 makes the set terminal SET of D flip-flop 22 become "low" and simultaneously set, thereby making the output terminal Q "high", at this time, D flip-flop 96 is ready to receive an input, thereby making the output terminal Q "low" state and the output of the exclusive OR gate "high". D flip-flop operating in binary counter, and D flip-flops 91-93 and D flip-flop 23 operating in penta counter are enabled to resolve the clear. D flip-flop 23 latches the data terminal D high according to the 48 KHZ clock pulses of second clock terminal 32, producing an output at the output terminal Q to AND gates 18 and 17. At this time, the outputs of the AND gates 18 and 17 are inputted to the clock terminals CLK of the first and second parallel/series shift registers 41 and 42, and the clock terminal of the shift/load SH/$\overline{LD}$ according to the clock pulses of FIG. 5, thereby producing 7F and 80 at the input terminals a-h of first parallel/series shift register 41, and FF and 00 at second parallel/series shift register 42. If the output of the second parallel/shift register 42 is inputted to the series input terminal Sin of first parallel/series shift register 42, the output terminal Qh of first parallel/series shift register 42 produces 7FFF, and another output terminal Qh 8000 as shown in FIGS. 4 and 5. Then, if the 48 KHZ signal of the second clock terminal 32 is inputted to the clock terminal CLK so as to be counted in binary mode in D flip-flop 81, the output terminal Q connected with the selecting control terminal S of multiplexer 51 causes by its output the outputs of Qh and $\overline{Qh}$ to be inputted to the terminals A and B, thereby producing selectively an output. If the state of Q is "high", the output of multiplexer 51 becomes 7FFF, and if the state of Q is "low", the output of multiplexer 51 becomes 7FFF. Namely, when the 48 KHZ signal 9a is generated as shown by signal 9b by counting in binary mode at D flip-flop 81, the synchronizing data are selected alternatingly twice according to each channel as shown by signal 9c, thereby being inputted to the DAT signal processing means through the selected passage of multiplexers 140 and 160.

On the other hand, the signal of the output terminal Q of D flip-flop 81 is inputted to the clock terminals CLK of D flip-flops 91-93, and passes the terminals after counting all the sixteen pulses (eight of 7FFF, eight of 8000) as shown as signal 9c, producing the output as shown as signals 9e-9g. The signal 9e and 9f is subjected to logic in AND gate 94. The output of AND gate 94 and the output of the output terminal Q of the D flip-flop 93 are subjected to logic in AND gate 95, producing the output as shown as signal 9h to the clock terminal CLK of D flip-flop 96. At this time, the output of the output terminal Q of the D flip-flop 96 is latched "high" as shown as signal 9i to select the selecting control terminal S of multiplexer 140 which inputs the synchronizing data selected, and prepare to input the video data of the digital video input terminal 1, which data are inputted to the exclusive OR gate 20 to produce the output of "low" state as shown as signal 9j, thereby clearing D flip-flops 23, 81, 91-93. Then, if the signal is inputted as memory addressing enabling signal through first and second control terminals CTL1 and CTL2 to address the memory, the data outputted according to the address are inputted to the terminal B of multiplexer 140 through the video input terminal 1, thereby causing the output to be inputted to DAT signal processing means through multiplexer 160. At this time, second control terminal CTL2 signals to DAT, the recording of video data. When the addressing of the memory is completed and therefore, the recording through multiplexers 140 and 160, the output of AND gate becomes "low" as shown in 9l by the input signal of the addressing completion signal terminal 29, thereby clearing D flip-flop 22. Since the output Q of D flip-flop 22 becomes "low", multiplexer 160 prepares to record the audio signal received by DAT recorder, and thereafter records the digital audio signals as coming in on the tape. The synchronizing data are distinguished because of their not existing in the audio signal pattern, and the synchronizing data of the video signal and video data complete their recording.

The detection of synchronizing pulse detecting means 170 will now be described detailedly with reference to the drawings of FIGS. 10-14.

Figure 10:
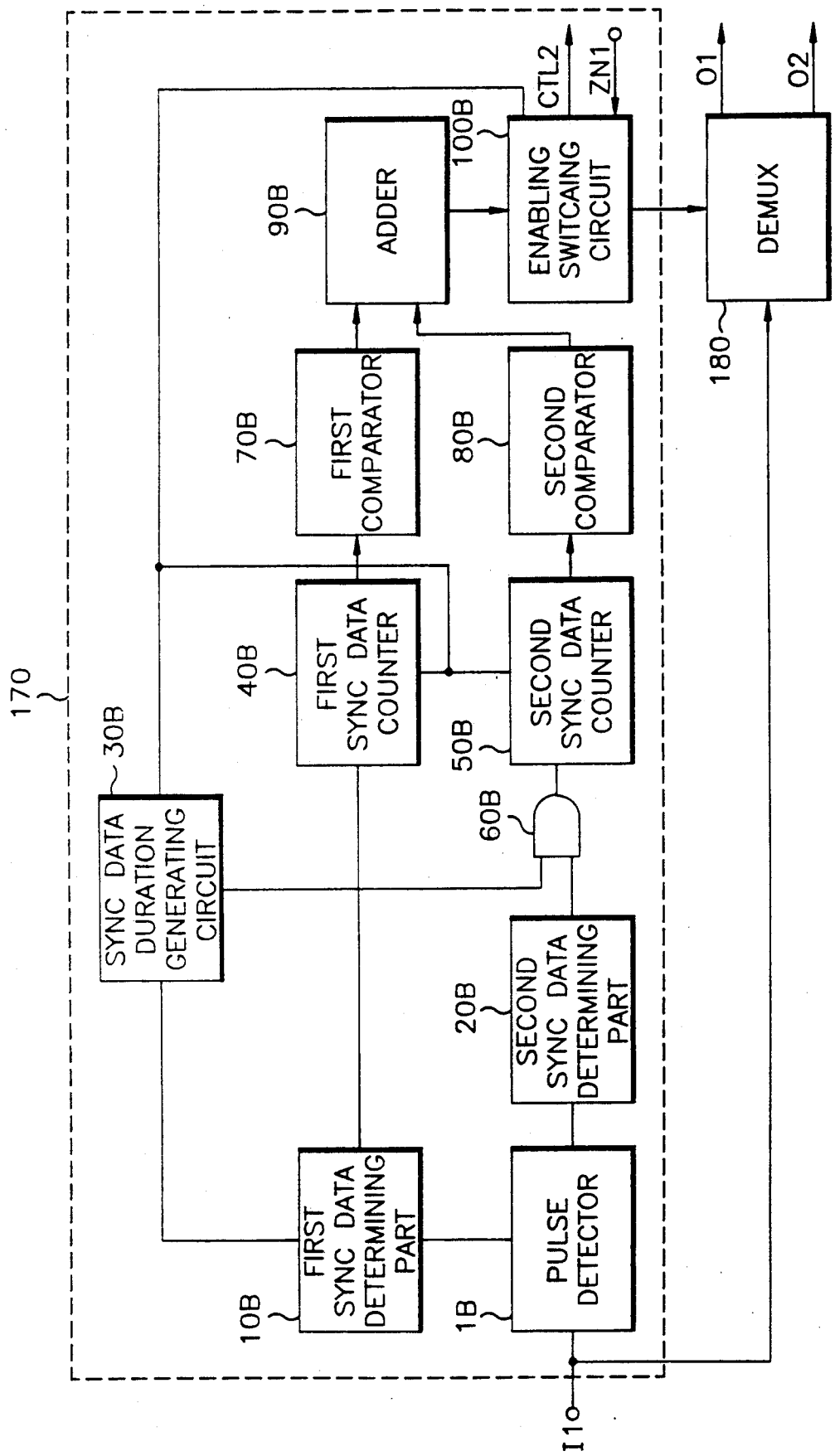
FIG. 10 is a block diagRAM for specifically showing the synchronizing pulse detecting part (170) of FIG. 1.

The synchronizing pulse detecting means 170 shown in FIG. 10 comprises synchronizing pulse detector 1B for detecting the synchronizing data 7FFF and 8000 from the synchronizing data on the digital audio tape and video data and audio data, first synchronizing data determining part 10B for determining first synchronizing data from said synchronizing pulse detector 1B, second synchronizing data determining part 20B for determining second synchronizing data 8000 from the output of said synchronizing pulse detector 1B, synchronizing data duration generating circuit 30B for generating an enabling signal having the period of a predetermined duration, said duration being the time taken from said synchronizing data determining part 20B begining to receive the synchronizing data until the detection of all the data being completed, first synchronizing data counter 40B for counting first synchronizing data 7FFF output of said first synchronizing data determining part 10B, counter enabling circuit 60B for generating counting increment signal according to the enabling signal of said synchronizing data duration generating circuit 30B and the output of said second synchronizing data determining part 20B, second synchronizing data counter 50B for counting second synchronizing data 8000 outputted from said second synchronizing data determining part 20B according to the output of said counter enabling circuit 60B, first and second comparators 70B and 80B for comparing the outputs of said first and second synchronizing data counters 40B and 50B with a reference value, adder 90B for determining whether the required synchronizing input is properly accomplished by adding the outputs of said first and second comparators 70B and 80B, enabling switching circuit 100B for generating the addressing enabling signal of RAM 110 by inputting the clock pulse outputted from said synchronizing data duration generating circuit 30B and the synchronizing data input completion signal of said adder, and switching signal for producing a control signal to convert the video data output into a memory, and demultiplexer 180 for selectively outputting the video or audio signal according to the output of said enabling switching circuit 100B.

According to the above construction, if the synchronizing video and audio data are simultaneously inputted through synchronizing and video data or audio data input terminal I1, synchronizing pulse detector 1B detects the synchronizing data. The detected data are determined as the synchronizing data 7FFF and 88000 by first and second synchronizing data determining parts 10B and 20B to be outputted. Namely, said first synchronizing data determining part 10B determines 7FFF signal, and synchronizing duration generating circuit 30B generates the duration signal having a predetermined duration of the first and second comparators 70B and 80B are combined by adder 90B, and synchronizing data input is properly accomplished, the signal is inputted to the enabling switching circuit 100B. At this time, the enabling switching circuit 100B is latched according to the clock pulses of the synchronizing data duration generating circuit 30B to generate the addressing enabling signal of RAM 110 to second control terminal CTL2, moreover, demultiplexer 180 is controlled so as to transmit the video and audio data inputted through synchronizing and input terminal I1 to the memory for storing the video data.

Figure 11:
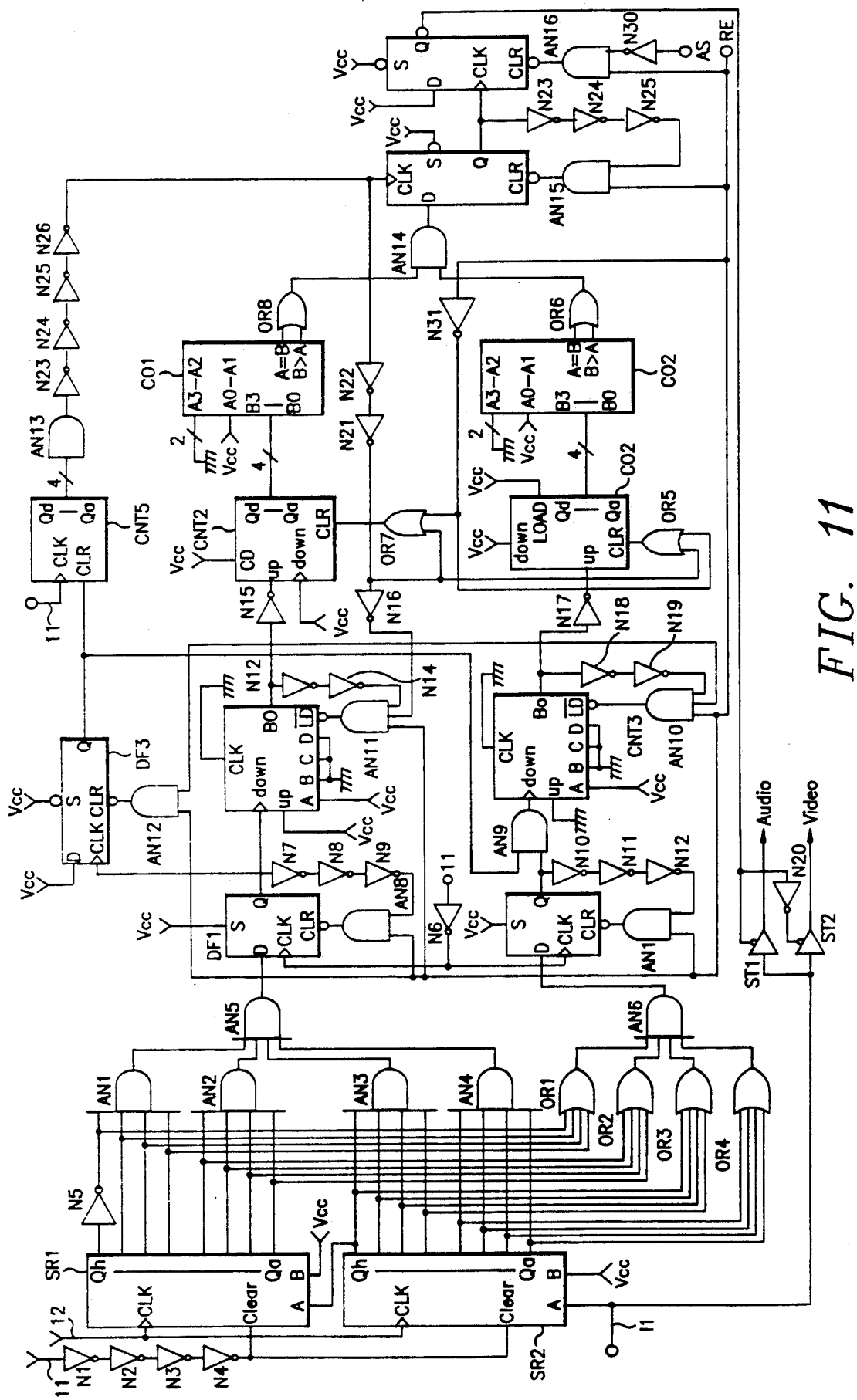
FIG. 11 is a specific circuit diagram of FIG. 10.
Figure 12:
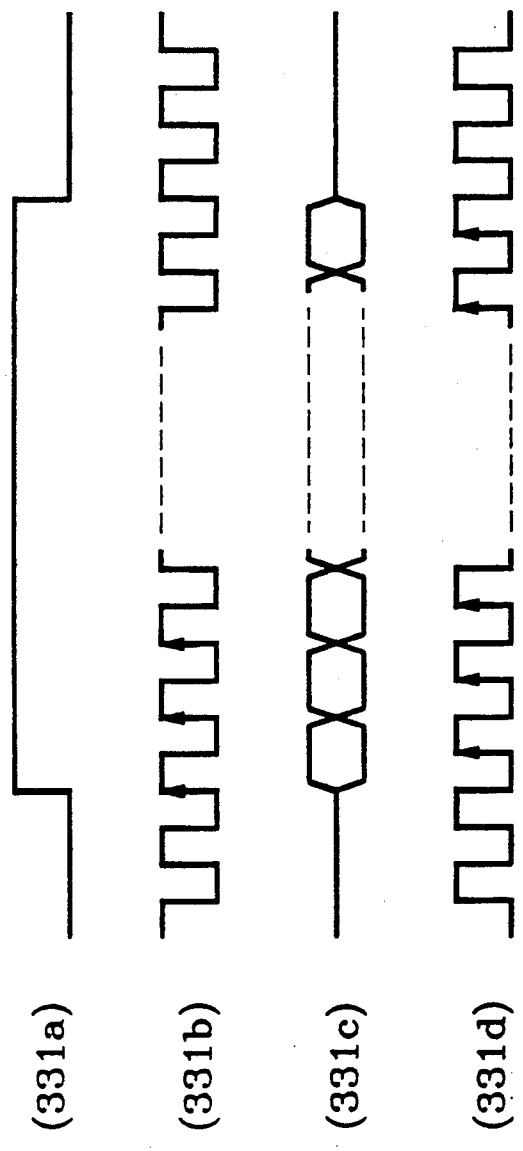
FIGS. 12-14 show the waveforms of operation of FIG. 11.

FIG. 11 is a diagram for showing specifically the circuit of FIG. 12 from the time when receiving the synchronizing data, which duration signal is inputted to the counter enabling circuit 60B and the enabling switching circuit 100B. At this time, the second synchronizing data counter 50B counts the output synchronizing data 8000 of the second synchronizing data determining part 20B, and the first synchronizing data counter 40B counts the output synchronizing data 7FFF of the first synchronizing data determining part 10B. The values obtained by counting as above are respectively inputted to first and second comparators 70B and 80B, which compare those values with a reference value, and determine whether the predetermined number of synchronizing data are inputted. When the outputs according to the present invention.

In FIG. 11, N1-N30 indicates inverters, SR1-SR2 shift registers, AN1-AN10 AND gates, OR1-OR8 OR gates, DF1-DF5 D flip-flops, CNT1-CNT5 counters, CO1-CO2 magnitude comparators, ST1-ST2 3-state buffers, and the portion comprising inverter N1-N4 and shift registers SR1-SR2 correspond to synchronizing pulse detector 1B, the portion comprising inverters N5,N7-9, AND gates AN1-AN5, AN8 and D flip-flop DF1 to first synchronizing data determining part 10B, the portion comprising OR gates OR1-OR4, AND gates AN6-AN7, inverters N6, N10-N12, and D flip-flop DF2 to second synchronizing data determining part 20B, the portion comprising AND gate AN9 to counter enabling circuit 60B, the portion comprising D flip-flop DF3, AND gates AN12,AN13, counter CNT5, and inverters N23-N26 to synchronizing data duration generating circuit 30B, the portion comprising counters CNT1-CNT2, inverters N13-N16, N31, N21-N22, OR gate OR7, and AND gate AN11 to first synchronizing data counter 40B, the portion comprising counters CNT3-CNT4, inverters N17-N19, AND gate AN10, and OR gate OR5 to second synchronizing data counter 50B, magnitude comparator CO1 to first comparator 70B, magnitude comparator CO2 to second comparator 80B, the portion comprising OR gates OR6, OR8, and AND gate AN14 to adder 90B, the portion comprising D flip-flops DF4,DF5, AND gates AN15-AN16, and inverters N27-N30 to the enabling switching circuit 100B, and the portion comprising inverter N20 and 3-state buffers ST1-ST2 to demultiplexer 110B.

FIG. 12 shows the clock pulse timing during reproducing according to the present invention.

Reference numerals 331a and 331b indicate the system clock pulses outputted from the digital audio tape recorder system, where 331a is the signal of 96 KHZ, indicating the input clock pulse of first clock terminal 11 of FIG. 11, and 331b is 3 MHZ signal waveform inputted second clock terminal 12.

The reference numeral 331d is 3 MHZ signal obtained by reversing 331b, indicating the input clock pulse of second clock terminal 12 of FIG. 2, and 331c is the waveform of the data outputted from the digital audio tape.

Figure 13:
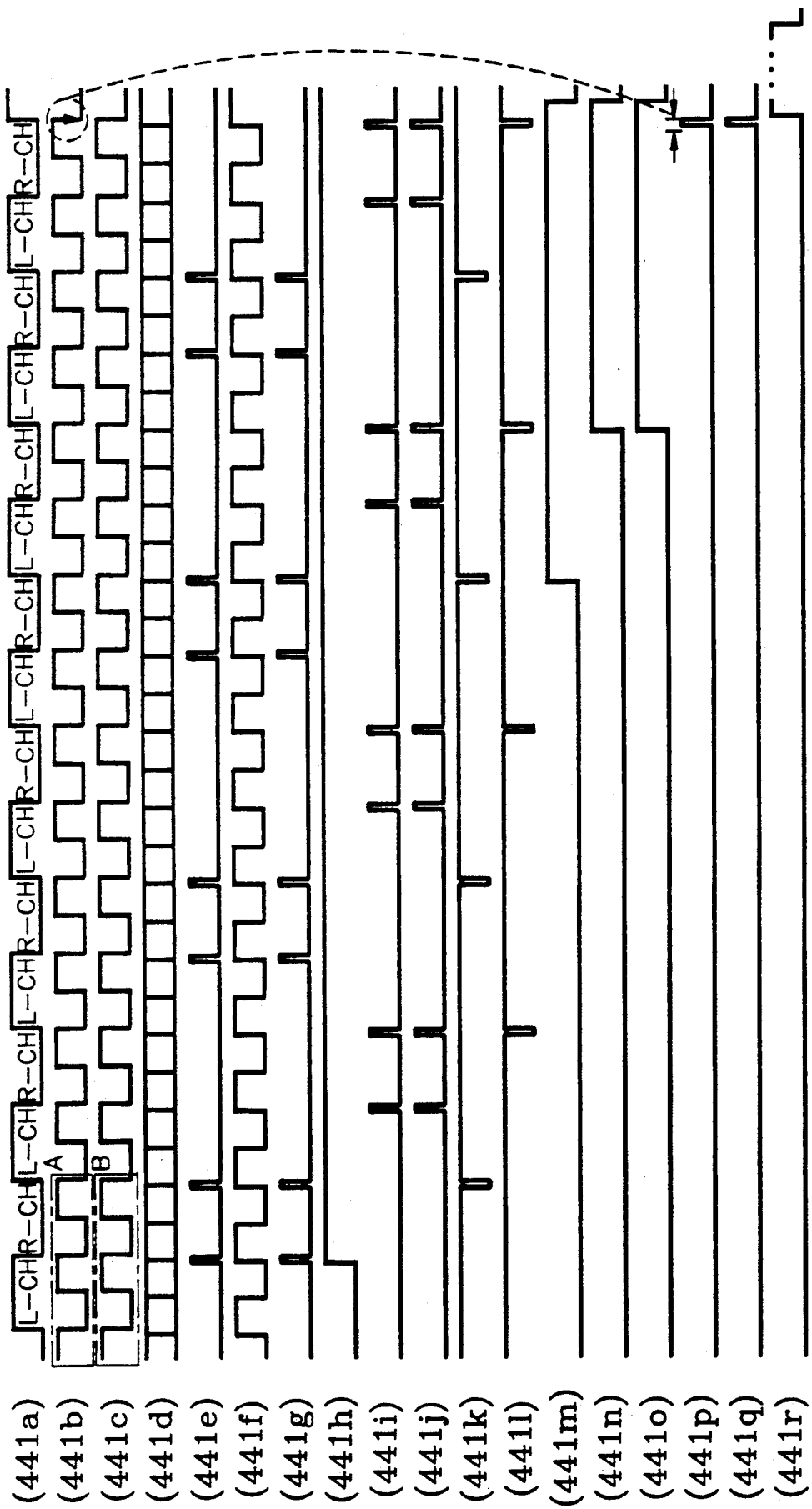

FIG. 13 is the operating waveform of FIG. 11 of synchronizing pulse detector according to the present invention. Reference numeral 441a is the channel selecting 48 KHZ clock pulse, 441c is the output signal of inverters N1-N4, 441d is an example of synchronizing and video data output, 441e is an example of AND gate AN5, 441f is the converted signal of 96 KHZ passing the output of inverter N6, 441g is the output signal of the output terminal Q of D flip-flop DF1, 441h is the output signal of the output terminal Q of D flip-flop DF3, 441i is an example of the output signal of the output terminal of AND gate AN6, 441j is an example for showing the output signal of the output terminal Q of D flip-flop DF2, 441K is an example for showing the output signal of the output terminal BO of counter CNT1, 441l is an example for showing the output signal of the output terminal BO of counter CNT3, 441m is an example of the output of OR gate OR8, 441n an example of the output of OR gate OR6, 441o is an example of the output of AND gate AN14, 441p is an example of the output through inverters N23-N26, 441q is an example for showing the output signal of the output terminal Q of D flip-flop DF4, and 441r is an example for showing the output signal of the output terminal Q of D flip-flop DF5.

Figure 14:
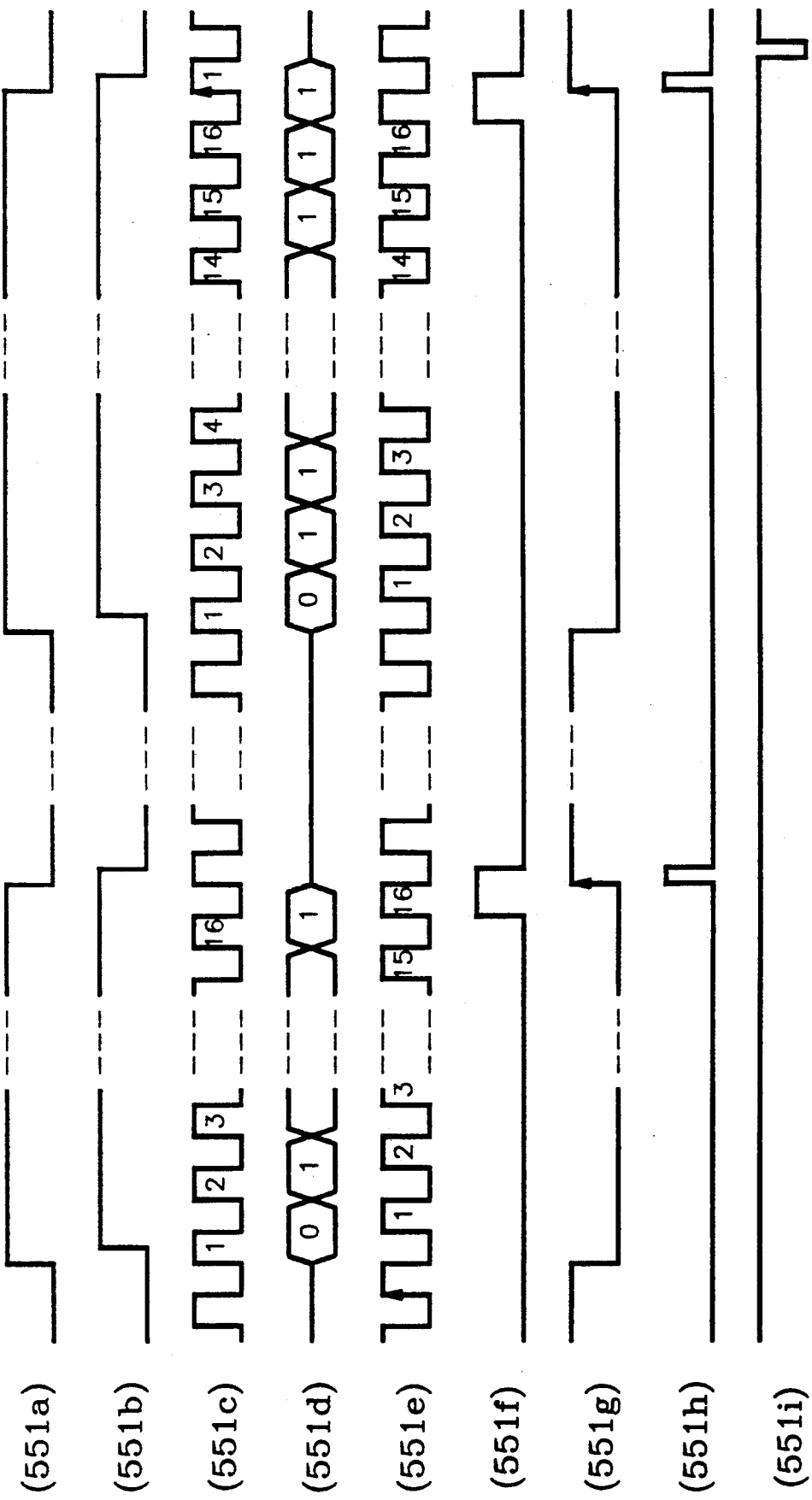

FIG. 14 shows the operating waveforms, magnifying the waveforms 441b-441g of FIG. 13.

A preferred embodiment of the present invention will now be described detailedly with reference to FIGS. 11-14.

3 MHZ clock pulse such as 331b is inputted to the clock terminals CLK of shift registers SR1,SR2 through the second clock pulse input terminal 12 from the digital audio recorder system, and 96 KHZ clock pulse 441b such as 331a is inputted through first clock pulse input terminal 11 and delayed in inverters N1-N4, producing an output such as 441c. This signal is inputted to the clear terminals CLR of the shift registers SR1,SR2. Synchronizing data of 441d inputted through digital synchronizing and video data and audio data input terminal Il are recorded into registers SR1,SR2 at "high" interval of 441b signal. 551a of 96 KHZ shown in FIG. 14 is "high", and as shown by the waveform of 551c, 16 of 3 MHZ clock pulses are inputted to shift the synchronizing data in shift registers SR1,SR2.

If the value of the output terminal Qh of the shift register R1 is "low", the output terminals Qg-Qa are "high", and the output terminals Qh-Qa are all "high", the value becomes 7FFF to produce the output of AND gate AN5 as the "high" pulse 441e through AND gates AN1-AN4. At this time, to the clock terminals CLK of D flip-flops DF1-DF2 is inputted 96 KHZ of first clock pulse input terminal 11 as 441f signal, which is firstly inverted in inverter N6. This signal latches the 441c signal in D flip-flop DF1 to produce an output as 441g, to the output terminal Q. If the 441g signal is inputted to the clock terminal CLK of D flip-flop DF3, the "high" state of the data terminal D is latched, and therefore, the output terminal Q produces the output as 441h. This signal is inputted to the clear terminal CLR of the counter CNT5 of 16 steps counting, releasing the clear and increasing the number of counts at the falling edge of 96 KHZ of first clock pulse input terminal 11. The 441h "high" signal is inputted to AND gate AN9 for counter CNT3 to down count the output of the output terminal Q of D flip-flop DF2, logically adding in OR gates OR1-OR4 the detected synchronizing data 8000 as the output of the output terminals Qa-Qh of shift registers SR1-SR2. The output of OR gates OR1-OR4 passes AND gate AN6, producing an output of the waveform 441i, which is latched according to the 441f signal, thereby producing an output such as 441j. The "high" pulse outputted through the AND gate AN9 is down counted in binary mode by counter CNT3, producing a borrow pulse such as 441e, where the input value of the counter CNT3 is loaded(LD) through inverters N18, N19. The high pulse of the output of D flip-flop DF1 is down counted by counter CNT1 in binary mode as the output of 441g, producing a borrow pulse. The counters CNT2, CNT4 up counted by each output of the counters CNT1, CNT3 increase the outputs by one.

Hence, if 7FFF is inputted once, D flip-flop DF1 produces an output of high pulse, and the counter CNT1 as a down counter decreases the counting number by one. Further, if 7FFF is inputted once again, D flip-flip DF1 produces an output of "high" pulse, and the down counter CNT1 generates an output of borrow pulse, loading it through inverters N13, N14, which is increased from 1 by up counter CNT2. At this time, 8000 is detected. Inputting this to D flip-flop DF2, the operations of the down counter CNT3 and the up counter CNT4 are the same as above. If 7FFF or 8000 data such as 441d are inputted six times or more by the operations as above, the up counter CNT2, CNT4 produces an output of "3(Qa=1, Qb=1, Qc=0, Qd=0) or "4(Qa=0, Qb=0, Qc=1, Qd=0) inputted respectively to the magnitude comparators CO1, CO2. If the magnitude comparators CO1, CO2 are compared with the input of each input terminal A0-A3 to produce "high" signal, OR gated OR8, OR6 produce an output as 441m, 441n applied to AND gate AN14. At this time, AND gate AN14 produces an output such as 441o. This makes possible that one or two among eight of 7FFF, is neglected, and likewise one or two among eight of 8000s.

On the other hand, the output of the counter CNT5 having 16 steps is inputted to AND gate AN13, which signal is delayed as 441p (as desired through inverters N23-N26), and inputted to the clock terminal CLK of D flip-flop DF4. Namely, if the output of AND gate AN14 is "high", and AND gate AN13 produces an output of "high" pulse (produced after counting 15 times, initially receiving 7FFF), the output terminal Q of D flip-flop produces an output of "high" pulse such as 441g, and the output terminal Q of D flip-flop DF5 produces an output of "high" pulse such as 441r, thereby making it known that the presently coming data is the video data. At this time, the "high" signal is produced through control terminal CTL2, enabling the addressing of RAM 110 as well as 3-state buffer ST2 through inverter N20 in order to transfer into memory the data coming from the digital audio tape. The passage outputted to audio processing means of the digital audio tape is disabled in 3-state buffer ST1. When all the video data are stored in the RAM 110, and the addressing of the RAM is completed, the signal representing completion of the addressing is applied through the addressing completion terminal AS. The output of inverter N30 connected with the addressing completion terminal AS is inputted to AND gate AN16, thereby clearing D flip-flop DF5 to cause the output terminal Q to produce a "low" output. Hence, 3-state buffer ST2 is disabled to block the video data passage. The initial operation of the system is done by the reset signal applied to the reset terminal RE connected with the input terminals of AND gates AN8, AN12, AN7, AN10, AN11, AN15, and AN16.

Therefore, according to the present invention, a great amount of digital video data is stored in the tape, and only the portions required of said data may be recorded as chosen, which facilitates effective management of the video files. Further video digital data are processed with error coding technology which accomplishes a high quality of the video image.

What is claimed is:

1. A system for recording/reproducing video data on or from a tape for storing digital signals, comprising:
   video signal input means for receiving a video signal;
   video signal output means for displaying visual representations of reproduced video signals;
   digital signal processor for editing, encoding and arranging tracks in a sequence when recording digital information on a tape according to a given format and for processing said digital information with error correction when reproducing said digital information from said tape;
   recording and reproducing means for mounting the tape to record or reproduce digital video and audio data from said digital signal processor on or from said tape;
   oscillating means for generating clock pulses of a predetermined frequency; and
   audio input/output means;
   circuit means for detecting a vertical synchronizing pulse from a composite video signal provided by said video signal input means;
   analog/digital converter for sampling said composite video signal according to said predetermined frequency and converting said composite video signal into digital video data by quantization;

means for designating a video signal frame to be stored into or read from a memory, and for designating video data stored in said memory for recording on said tape;

said memory for storing said digital video data;

first controller means for generating a control signal for controlling writing/reading of said digital video data to or from said memory in dependence upon a vertical synchronizing pulse detecting signal from said means for designating a video signal frame and a vertical synchronizing pulse from said vertical synchronizing pulse detecting circuit means, and for applying the control signal to control generation of an address signal for access to said digital video data;

second controller means for controlling recording and reproduction of digital information on or from said tape by controlling said recording and reproducing means in a record and play key mode, and for generating a synchronous control signal to synchronize various components of the system; and means for generating a synchronizing pulse corresponding to a synchronizing enabling pulse of said second controller means to separate audio signal from video signal;

parallel/series converter means for synchronizing reading of parallel data from said memory under control of said second controller means while in a mode for recording data on said tape and converting said parallel data into series data;

first multiplexer means for selecting under control of said second controller means the synchronizing pulse and video digital data output from said parallel/series converter means;

second multiplexer means for selecting one of said video digital data from said first multiplexer means in dependence upon said synchronous control signal and for selecting audio digital data from said audio input/output means;

means for detecting a synchronizing pulse from data recorded on the tape;

demultiplexer means for selecting, in response to an output control signal of said second controller means, video and audio signals from said digital signal processor during reproduction;

series/parallel converter means for converting series video data of said demultiplexer means into parallel data in dependence upon said synchronous control signal from said second controller means;

means for generating a quasi-vertical synchronizing pulse in dependence upon said control signal;

digital/analog converter means for converting digital data from said memory into analog video signals in dependence upon said sampling signal of said oscillating means;

means for adding the quasi-vertical synchronizing pulse and the analog video signals from said digital/analog converter means to produce a reproduced composite video signal at said video signal output means for a video display;

first converter means for collecting said digital video data from said analog/digital converter so as to correspond to an access time according to a sampling signal of said oscillating means and for converting said digital video data into parallel;

input and output port circuit means for selecting a direction in correspondance with reading/writing of the video data from or to said memory in dependence upon a signal provided by said first controller means for controlling the direction of data flow; and second converter means for collecting as desired video data, video data read from said memory through said input and output port circuit, and converting said desired video data into series data.

2. A system for recording and reproducing video data on or from a tape as digital signals, comprising:

receiving means for receiving an analog video signal and for converting said analog video signal to a parallel digital video signal;

memory means for receiving and storing designated frames of said digital video signal as stored data, and for outputting said stored data for further processing;

first multiplexing means for converting the stored data, output from said memory means in parallel, to serial data and outputting a digital multiplexed signal;

audio input means for applying a digital audio signal to said first multiplexing means wherein said first multiplexing means multiplexes said serial data and said digital audio signal to produce said digital multiplexed signal;

digital signal processing means for editing, encoding and arranging said digital multiplexed signal according to a given recording tape format prior to recording and for performing error correction of a reproduced signal played back from said tape thereby producing an error corrected signal including video information and audio information;

recording and reproducing means for mounting the tape to record the edited, encoded and arranged digital multiplexed signal and for generating said reproduced signal from said tape;

demultiplexing means for receiving said error corrected signal for providing said audio information to an audio output means and for providing said video information to said memory means in parallel format;

output means coupled for receiving the parallel video information from said memory means, and for converting said parallel video information into a serial output video signal for display;

first control means for controlling writing and reading of said designated frames of said digital video signal in response to a vertical synchronization signal and a frame designation signal, and for generating first address signals;

oscillator means for providing first timing signals to said receiving means and said output means, second timing signals to said receiving means and said output means, and third timing signals to said first control means;

second control means coupled to receive a record signal or a playback signal for synchronizing said first multiplexing means and said demultiplexing means, for controlling recording and reproduction of said digital video signal, and for generating second address signals;

second multiplexing means for receiving said first address signals and said second address signals and for providing an address output signal to said memory means in response to a control signal from said second control means; and enabling means for receiving enabling signals from said first control means and said second control means and for providing memory enabling signals to said memory means in response to said control signal from said second control means.

3. The system for recording and reproducing video data on or from a tape as set forth in claim 2, wherein said receiving means comprises:
an analog-to-digital converter responsive to said first timing signals for converting said received analog video signal into a digital video signal; and
a first converter responsive to said second timing signals for receiving said digital video signal and producing said parallel digital video signal.

4. The system for recording and reproducing video data on or from a tape as set forth in claim 2, wherein said memory means comprises:
an input/output port circuit responsive to said first control means for inputting said parallel digital video signal to a memory and for outputting said parallel video information;
wherein said memory is responsive to said memory enabling signal and said first and second address signals for storing said designated frames and outputting said stored data;
gate means responsive to said second control means for controlling a first buffer for buffering said stored data output by said memory; and
a second buffer responsive to said gate means for buffering said parallel video information output by said demultiplexing means.

5. The system for recording and reproducing video data on or from a tape as set forth in claim 2, wherein said first multiplexing means comprises:
a parallel-to-series converter responsive to said second control means for converting said stored data into said serial data;
a first multiplexer for multiplexing said serial data with a synchronization signal from said second control means and outputting a first multiplex signal; and
a second multiplexer for multiplexing said first multiplex signal with said digital audio signal to produce said digital multiplexed signal.

6. The system for recording and reproducing video data on or from a tape as set forth in claim 2, wherein said demultiplexing means comprises:
a demultiplexer responsive to said second control means for separating said video information from said audio information; and
a serial-to-parallel converter responsive to said second control means for converting said video information into said parallel format.

7. The system for recording and reproducing video data on or from a tape as set forth in claim 2, further comprised of output means comprising:
a converter responsive to said second timing signals for converting said parallel video information read from said memory means into a serial digital video signal;
a digital-to-analog converter responsive to said first timing signals for receiving said serial digital video signal and producing a serial analog video signal; and
an adder for combining said serial analog video signal with a quasi-vertical synchronization signal for producing said serial output video signal.

8. The system for recording and reproducing video data on or from a tape as set forth in claim 2, wherein said first control means comprises:

vertical synchronization signal detecting means for separating said vertical synchronization signal from said received analog video signal;
first switch means for designating said designated frames and outputting a first designation signal as said frame designation signal:
first controller means responsive to said vertical synchronization signal, said first designation signal and said third timing signals for producing a first count control signal, a first output enable signal, and a first write enable signal; and
first counting means responsive to said first count control signal for counting an input clock signal from said oscillator means and for producing said first address signals.

9. The system for recording and reproducing video data on or from a tape as set forth in claim 8, wherein said second control means comprises:
second switch means for designating the stored data to be recorded on said tape, and for outputting a second designation signal;
a second controller means responsive to a clock signal from said digital signal processing means, for controlling a synchronization signal generator to generate synchronization pulses, and for controlling said first multiplexing means;
a synchronization detector means having an input connected to receive said error corrected signal, for detecting synchronization data and providing an output to said second controller means;
said second controller means being responsive to said second designation signal and said output of said synchronization detector means, for controlling said demultiplexing means, said memory means and said enabling means;
wherein said second controller means also outputs a second output enable signal, a second write enable signal, a second count control signal and a clock signal; and
second counting means responsive to said second count control signal for counting said clock signal output by said second controller means for producing said second address signals.

10. The system for recording and reproducing video data on or from a tape as set forth in claim 9, wherein said enabling means comprises:
first selecting means responsive to said second controller for selecting either said first output enable signal or said second output enable signal to provide a first memory enabling signal to said memory means; and
second selecting means responsive to said second controller for selecting either said first write enable signal or said second write enable signal to provide a second memory enabling signal to said memory means.

11. A system for recording and reproducing video data on or from a tape as digital signals, comprising:
receiving means for receiving video signals as parallel digital video signal;
memory means for receiving and storing designated frames of said digital video signal as stored data, and for outputting said stored data for further processing;
first multiplexing means for converting the stored data, output from said memory means in parallel, to serial data and outputting a digital multiplexed signal;

audio input means for applying a digital audio signal to said first multiplexing means wherein said first multiplexing means multiplexes said serial data and said digital audio signal to produce said digital multiplexed signal;

digital signal processing means for editing, encoding and arranging said digital multiplexed signal according to a given recording tape format prior to recording and for performing error correction of a reproduced signal played back from said tape thereby producing an error corrected signal including video information and audio information;

recording and reproducing means for mounting the tape to record the edited, encoded and arranged digital multiplexed signal and for generating said reproduced signal from said tape;

demultiplexing means for receiving said error corrected signal for providing said video information to said memory means in parallel format, and for providing said audio information to an audio output circuit;

output means coupled for receiving the parallel video information from said memory means, and for converting said parallel video information into a serial output video signal for display;

control means coupled to receive a record signal or a playback signal for synchronizing said first multiplexing means and said demultiplexing means, for controlling writing and reading of said designated frames of said digital video signal in response to a vertical synchronization signal and a frame designation signal, and for generating first address signals for controlling recording and reproduction of said digital video signal, and for generating second address signals;

oscillator means for providing first timing signals to said receiving means and said output means, second timing signals to said receiving means and said output means, and third timing signals to said control means;

second multiplexing means for receiving said first address signals and said second address signals and for providing an address output signal to said memory means in response to a control signal from said control means; and enabling means for receiving enabling signals from said first control means and said second control means and for providing memory enabling signals to said memory means in response to said control signal from said second control means.

12. The system for recording and reproducing video data on or from a tape as set forth in claim 11, wherein said receiving means comprises:

an analog-to-digital converter responsive to said first timing signals for converting said received analog video signal into a digital video signal; and a first converter responsive to said second timing signals for receiving said digital video signal and producing said parallel digital video signal.

13. The system for recording and reproducing video data on or from a tape as set forth in claim 11, wherein said memory means comprises:

an input/output port circuit responsive to said control means for inputting said parallel digital video signal to a memory and for outputting said parallel video information;

wherein said memory is responsive to said memory enabling signal and said first and second address signals for storing said designated frames and outputting said stored data;

gate means responsive to said control means for controlling a first buffer for buffering said stored data output by said memory; and a second buffer responsive to said gate means for buffering said parallel video information output by said demultiplexing means.

14. The system for recording and reproducing video data on or from a tape as set forth in claim 11, wherein said first multiplexing means comprises:

a parallel-to-series converter responsive to said control means for converting said stored data into said serial data;

a first multiplexer for multiplexing said serial data with a synchronization signal from said control means and outputting a first multiplex signal; and a second multiplexer for multiplexing said first multiplex signal with said digital audio signal to produce said digital multiplexed signal.

15. The system for recording and reproducing video data on or from a tape as set forth in claim 11, wherein said demultiplexing means comprises:

a demultiplexer responsive to said control means for separating said video information from said audio information; and a serial-to-parallel converter responsive to said control means for converting said video information into said parallel format.

16. The system for recording and reproducing video data on or from a tape as set forth in claim 11, further comprised of output means comprising:

a converter responsive to said second timing signals for converting said parallel video information read from said memory means into a serial digital video signal;

a digital-to-analog converter responsive to said first timing signals for receiving said serial digital video signal and producing a serial analog video signal; and an adder for combining said serial analog video signal with a quasi-vertical synchronization signal for producing said serial output video signal.

17. The system for recording and reproducing video data on or from a tape as set forth in claim 11, wherein said control means comprises:

vertical synchronization signal detecting means for separating said vertical synchronization signal from a received analog video signal;

first switch means for designating said designated frames and outputting a first designation signal;

first controller means responsive to said vertical synchronization signal, said designated frames and said third timing signals for producing a first count control signal, a first output enable signal, and a first write enable signal; and first counting means responsive to said first count control signal for counting an input clock signal from said oscillator means and for producing said first address signals.

18. The system for recording and reproducing video data on or from a tape as set forth in claim 17, wherein said control means comprises:

second switch means for designating the stored data to be recorded on said tape, and for outputting a second designation signal;

a second controller means responsive to a clock signal from said digital signal processing means, for controlling a synchronization signal generator to generate synchronization pulses, and for controlling said first multiplexing means;

a synchronization detector means having an input connected to receive said error corrected signal, for detecting synchronization data and providing an output to said second controller means;

said second controller means being responsive to said second designation signal and said output of said synchronization detector means, for controlling said demultiplexing means, said memory means and said enabling means;

wherein said second controller means also outputs a second output enable signal, a second write enable signal, a second count control signal and a clock signal; and second counting means responsive to said second count control signal for counting said clock signal output by said second controller means for producing said second address signals.

19. The system for recording and reproducing video data on or from a tape as set forth in claim 18, wherein said enabling means comprises:

first selecting means responsive to said second controller for selecting either said first output enable signal or said second output enable signal to provide a first memory enabling signal to said memory means; and second selecting means responsive to said second controller for selecting either said first write enable signal or said second write enable signal to provide a second memory enabling signal to said memory means.

* * * * *

UNITED STATES PATENT AND TRADEMARK OFFICE
CERTIFICATE OF CORRECTION

PATENT NO. : 5,093,750

DATED : 3 March 1992

INVENTOR(S) : Chun-Woong PARK et al.

Page 1 of 4

It is certified that error appears in the above-identified patent and that said Letters Patent is hereby corrected as shown below:

ON THE TITLE PAGE

Column 1, item [73], change "SanSung" to --SamSung--;

Title page,
IN THE ABSTRACT

Line 5, replace "coutroller" with --controller--;

Line 16, insert --a-- before "synchronizing";

Line 19, insert --in-- before "which";

Column 1, Line 32, replace "As the" with --The--, and insert --used-- after "medium";

Line 33, delete "used";

Line 41, replace "disk" (both occurrences) with --disks--;

Line 47, insert --the-- before "(DAT)";

Line 50, insert --are-- before "digitalized";

Line 54, replace "a cheap" with --an inexpensive--;

Line 63, replace "a cheap" with --an inexpensive--.

UNITED STATES PATENT AND TRADEMARK OFFICE
CERTIFICATE OF CORRECTION

PATENT NO. : 5,093,750

DATED : 3 March 1992

INVENTOR(S) : Chun-Woong PARK et al.

It is certified that error appears in the above-identified patent and that said Letters Patent is hereby corrected as shown below:

Column 1,   Line 64,   insert --and-- before "read";

Column 2,   Line 5,   delete the semicolon (first occurrence),

Line 14,   replace "on" (first occurrence) with --and--;

Line 17,   replace "puleses" with --pulses--;

Line 19,   replace "puleses" with --pulses--, and insert --a-- before "circuit";

Lines 47 & 48,   replace "parallal" with --parallel--;

Line 58,   replace "autio" with --audio--;

Column 3,   Line 55,   replace "diagRAM" with --diagram--;

Line 57,   replace "diagRAM" with --diagram--;

Column 4,   Line 3,   replace "diagRAM" with --diagram--;

Line 52,   delete the comma after "processing";

Column 5,   Line 36,   insert --through a-- after "it", and insert --converter-- after "D/A";

UNITED STATES PATENT AND TRADEMARK OFFICE
CERTIFICATE OF CORRECTION

PATENT NO. : 5,093,750
DATED : 3 March 1992
INVENTOR(S) : Chun-Woong PARK et al.

It is certified that error appears in the above-identified patent and that said Letters Patent is hereby corrected as shown below:

Column 8,  Line 12,  replace "driver" with --driven--;

Line 23,  replace "FIG." with --FIGS.--;

Line 52,  delete "are";

Line 64,  replace "guasi-synchronizing" with --quasi-synchronizing--

Column 9,  Line 9,  insert --to-- after "Referring";

Column 10, Line 54, insert --to-- after "Referring";

Line 60,  delete "as the" (second occurrence);

Line 61,  delete "input clock pulse";

Column 11, Line 6,  insert --the-- before "AND";

Line 40,  replace "sin" with --$S_{in}$--;

Line 51,  replace "Flip-Flop" with --flip-flop--;

Line 67,  replace "Flip" with --flip--;

Column 13, Line 52, replace "Sin" with --$S_{in}$--;

UNITED STATES PATENT AND TRADEMARK OFFICE
CERTIFICATE OF CORRECTION

PATENT NO. : 5,093,750
DATED : 3 March 1992
INVENTOR(S) : Chun-Woong PARK et al.

It is certified that error appears in the above-identified patent and that said Letters Patent is hereby corrected as shown below:

Column 14, Line 33, insert --the-- before "AND";

Column 15, Line 26, replace "88000" with --8000--;

Line 58, replace ". When" with --when--;

Line 59, insert --are-- after "outputs";

Column 16, Line 65, insert --A-- before "3MHZ".

Column 19, Line 67, replace "correspondance" with --correspondence--.

Signed and Sealed this

Fifteenth Day of June, 1993

Attest:

MICHAEL K. KIRK

*Attesting Officer*  *Acting Commissioner of Patents and Trademarks*